(12) United States Patent
White et al.

(10) Patent No.: US 9,879,403 B2
(45) Date of Patent: Jan. 30, 2018

(54) HYDRAULIC HYBRID SWING DRIVE SYSTEM FOR EXCAVATORS

(71) Applicant: Parker-Hannifin Corporation, Cleveland, OH (US)

(72) Inventors: Nicholas N. White, Shaker Heights, OH (US); James Howland, Mayfield Heights, OH (US); Hao Zhang, Twinsburg, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 170 days.

(21) Appl. No.: 14/910,339

(22) PCT Filed: Aug. 8, 2014

(86) PCT No.: PCT/US2014/050374
§ 371 (c)(1),
(2) Date: Feb. 5, 2016

(87) PCT Pub. No.: WO2015/021400
PCT Pub. Date: Feb. 12, 2015

(65) Prior Publication Data
US 2016/0168822 A1 Jun. 16, 2016

Related U.S. Application Data

(60) Provisional application No. 61/863,662, filed on Aug. 8, 2013.

(51) Int. Cl.
*E02F 9/12* (2006.01)
*E02F 9/22* (2006.01)
(Continued)

(52) U.S. Cl.
CPC .............. *E02F 9/123* (2013.01); *B66C 23/86* (2013.01); *E02F 9/2217* (2013.01);
(Continued)

(58) Field of Classification Search
CPC . F15B 1/04; F15B 11/08; E02F 9/2296; E02F 9/123; E02F 9/2217; B66C 23/86; G01C 19/04
See application file for complete search history.

(56) References Cited

U.S. PATENT DOCUMENTS 5,603,239 A * 2/1997 Chong .................... B66C 23/74
212/195
5,835,874 A * 11/1998 Hirata .................... E02F 3/435
414/4

(Continued)

FOREIGN PATENT DOCUMENTS

| CN | 102493517 A | 6/2012 |
| JP | 2012127154 A | 7/2012 |
| JP | 2013005469 A | 1/2013 |

OTHER PUBLICATIONS

International Search Report and Written Opinion for corresponding patent application No. PCT/US2014/050374 dated Oct. 17, 2014.
(Continued)

*Primary Examiner* — Thomas E Lazo
(74) *Attorney, Agent, or Firm* — Renner, Otto, Boisselle & Sklar, LLP

(57) ABSTRACT

A hydraulic machine includes an undercarriage; a rotating structure rotatably mounted on the undercarriage and configured to rotate with and with respect to the undercarriage; a first controller configured to receive user input and configured; a user interface configured to accept commands from a user and output a command signal to the controller; and a first gyroscope fixed to the rotating structure and electrically connected to the controller and configured to provide a data signal of rotation information of the rotating structure to the controller. An axis of rotation of the gyroscope is parallel to the axis of rotation of the rotating structure. The controller is configured to generate a control
(Continued)

signal to control the rotating structure and cause the rotating structure to rotate with respect to the undercarriage based on the command signal from the user interface and the data signal from the first gyroscope.

27 Claims, 16 Drawing Sheets

(51) Int. Cl.
    *E02F 9/26* (2006.01)
    *G01C 19/00* (2013.01)
    *B66C 23/86* (2006.01)
    *F15B 1/033* (2006.01)
    *F15B 1/04* (2006.01)
    *F15B 11/08* (2006.01)
    *F15B 13/04* (2006.01)
    *G01C 19/04* (2006.01)

(52) U.S. Cl.
    CPC .......... *E02F 9/2253* (2013.01); *E02F 9/2285* (2013.01); *E02F 9/2296* (2013.01); *E02F 9/265* (2013.01); *F15B 1/033* (2013.01); *F15B 1/04* (2013.01); *F15B 11/08* (2013.01); *F15B 13/0401* (2013.01); *G01C 19/00* (2013.01); *G01C 19/04* (2013.01); *F15B 2211/20546* (2013.01); *F15B 2211/255* (2013.01); *F15B 2211/405* (2013.01)

(56) References Cited

U.S. PATENT DOCUMENTS

| | | | |
|---|---|---|---|
| 9,621,079 B2 * | 4/2017 | Ogawa | E02F 9/2095 |
| 2009/0217653 A1 | 9/2009 | Zhang et al. | |
| 2010/0236232 A1 | 9/2010 | Boehm et al. | |
| 2010/0299031 A1 | 11/2010 | Zhdanov et al. | |
| 2012/0283919 A1 | 11/2012 | Kuras et al. | |
| 2014/0261152 A1 * | 9/2014 | Tanaka | E02F 9/2033 |
| | | | 116/230 |

OTHER PUBLICATIONS $2^{nd}$ Written Opinion for corresponding patent application No. PCT/US2014/050374 dated Aug. 18, 2015.

International Preliminary Report on Patentability corresponding patent application No. PCT/US2014/050374 dated Nov. 12, 2015.

Office Action for corresponding Chinese Patent Application No. 201480055754.5 dated Mar. 3, 2017.

\* cited by examiner

HYDRAULIC HYBRID SWING DRIVE SYSTEM FOR EXCAVATORS

This application is a national phase of International Application No. PCT/US2014/050374 filed Aug. 8, 2014 and published in the English language, which claims priority to U.S. Provisional Application No. 61/863,662 filed Aug. 8, 2013, which are hereby incorporated herein by reference.

RELATED APPLICATIONS

This application claims the benefit of U.S. Provisional Application No. 61/863,662 filed Aug. 8, 2013, and International Application No. PCT/US2014/013861, filed Jan. 30, 2014, both of which are hereby incorporated herein by reference.

FIELD OF INVENTION

The present invention relates generally to hydraulic systems, and more particularly to hydraulic hybrid drive systems.

BACKGROUND

An excavator is an example of a construction machine that uses multiple hydraulic actuators to accomplish a variety of tasks. These actuators are fluidly connected to a pump that provides pressurized fluid to chambers within the actuators. This pressurized fluid force acting on the actuator surface causes movement of actuators and connected work tools. Once the hydraulic energy is utilized, pressurized fluid is drained from the chambers to return to a low pressure reservoir. Usually the fluid being drained is at a higher pressure than the pressure in the reservoir and hence this remaining energy is wasted once it enters the reservoir. This wasted energy reduces the efficiency of the entire hydraulic system over a course of machine duty cycle.

A prime example of energy loss in an excavator is its swing drive where the fluid emptying to the low pressure reservoir is throttled over a valve during the retardation portion of its motion to effect braking of swing motion. It is estimated that total duration of swing use in an excavator is about 50%-70% of an entire life cycle and it consumes 25%-40% of the energy that engine provides. Another undesirable effect of fluid throttling is heating of the hydraulic fluid which results in increased cooling requirement and cost.

Applying electronic control to hydraulically controlled devices unlocks numerous control opportunities not previously available which may increase performance and efficiency. However, these control opportunities often also require additional information regarding the state of the device such as speed, position, pressure, etc. In developing additional control opportunities for the swing drive of a material handling device, such as an excavator, measuring and using the swing speed is useful. Acquiring the swing speed of the material handling device can be done in a number of ways whether it be measuring the speed of the device directly or by measuring some related quantity, such as the speed of the swing motor, and computing the expected swing speed.

SUMMARY OF INVENTION

Therefore, exemplary hydraulic hybrid swing drive systems (referred to herein as HSD for brevity) may provide a number of advantages over conventional hydraulic excavators and conventional electric hybrid excavators (EHEs):

1. Obtaining the rotational velocity via direct measurement as opposed to taking the numerical derivative of a rotational position measurement. This results in obtaining a more accurate velocity measurement with less delay.
2. Simpler to retrofit a vehicle with a gyroscope as opposed to the conventional methods of using a hall effect sensor on the motor or gearbox to determine rotational velocity.
3. A gyroscope can be applied to any part of the upper carriage of a structure and does not need to be at the axis of rotation. This is because all parts of the upper carriage rotate at the same angular velocity. This provides significant flexibility in mounting location and wiring requirements.
4. Using a gyroscope may be less costly than some methods of determining rotational velocity such as the aforementioned method of computing the velocity via numerical derivatives from a rotational position measurement.
5. A relief valve provides a greater response to pressure spikes than a pressure compensator, making it an overall safer and more robust system.
6. Anti-cavitation check valves can be added to add robustness to a system, especially with an over center pump application.
7. A servo pressure control of displacement can increase the response time when going over center on a pump.
8. A low pressure accumulator can be used as a low pressure source to feed the makeup and anti-cavitation checks in a hydraulic circuit with a changing volume.
9. Relays can be used to provide additional controllability in a retrofit application to interface with a stock controller without changing any software on the controller.

According to one aspect of the invention,

The foregoing and other features of the invention are hereinafter described in greater detail with reference to the accompanying drawings.

DETAILED DESCRIPTION

Exemplary hydraulic hybrid swing drive systems (referred to herein as HSD) may be used on construction equipment, especially hydraulic excavators. A goal of exemplary HSDs is to capture energy during the braking of a swing function of an excavator and store it in a hydraulic accumulator and/or allowing the swing pump/motor to provide additional torque to assist the engine for powering working hydraulics actuation functions and auxiliary equipment. A second goal is to achieve the same or better performance, operability, and controllability as the conventional hydraulic excavator, while using less fuel and reducing emissions, through the use of electronically controlled components.

Figure 1:
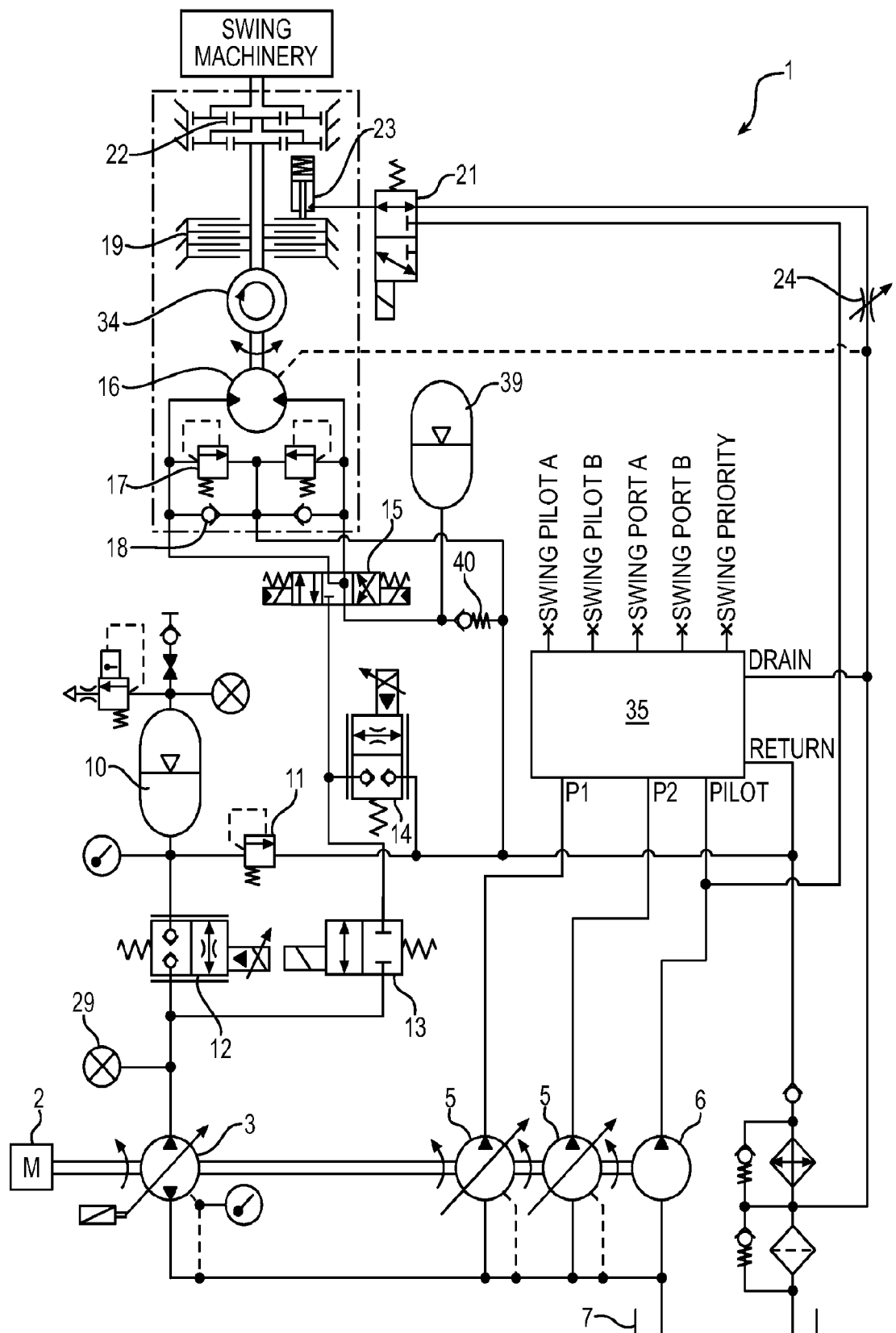
FIG. 1 shows a schematic illustration of an exemplary HSD.

Exemplary HSDs may be utilized, for example, in excavators with a fixed displacement swing motor having an upper structure, undercarriage, swing, boom, arm and bucket. As schematically shown in FIG. 1, an exemplary HSD assembly 1 may include a prime mover 2 (e.g., a diesel engine), a hydraulic swing pump 3, a hydraulic swing motor 16, a hydraulic accumulator 10, and a hydraulic tank/reservoir 7 accompanied by various control valves. In particular, the illustrated HSD assembly includes a swing control valve assembly (here depicted as a single swing control spool valve) 15, a dump valve 14, an isolation valve 13, an accumulator control valve 12.

In a conventional machine without HSD, flow returning to the atmospheric pressure reservoir during swing braking is throttled over a valve to control the deceleration and thereby dissipate energy. Exemplary HSD hydraulic circuits may be arranged such that in a retarding mode, the hydraulic swing motor 16 acts as a pump and provides a resistive torque to the swing machinery.

The swing control valve 15 directs the high pressure flow to the hydraulic accumulator 10, the swing pump 3, and/or the dump valve 14. In this mode, the swing pump 3 could thereby act as a motor by converting hydraulic flow into mechanical movement.

The isolation valve 13 may be used to separate the swing pump/motor 3 and the hydraulic accumulator 10 from the rest of the system for safety reasons and/or to allow use of the swing pump 3 and accumulator 10 simultaneously or individually with braking the swing motor 16 via the dump valve 14.

The accumulator control valve 12, in braking modes, may be used to ensure a nearly equal pressure drop from the high pressure flow to both the swing pump/motor 3 and the hydraulic accumulator 10.

Similarly, the accumulator control valve 12 may be used to control the pressure of the fluid directed to the swing motor 16 when accelerating.

Recovered energy can be stored in the hydraulic accumulator 10 as pressure for later use and/or transferred back to the engine shaft through the swing pump 3 to supplement the engine power going to accessories or other work functions.

If the hydraulic accumulator 10 is full or if the pressure in the accumulator 10 is greater than or equal to the pressure needed to retard the swing machinery, then the dump valve 14 can be used to set the pressure instead of the accumulator 10 and accumulator valve 12; the balance of the energy that cannot be recovered by the engine shaft or the accumulator would be dissipated by the dump valve in an operation similar to that of conventional systems. The built up pressure in the hydraulic accumulator 10 can then be used to propel the swing upon the next operator command.

In this configuration, the swing pump 3 and the swing control valve 15, with possible additional flow from the hydraulic accumulator 10, are used to control the propulsion of the swing function. When powering the swing movement, the swing control valve 15 may shift to connect the high pressure flow of the swing pump/motor 3 and possibly the hydraulic accumulator 10 to the appropriate side of the swing motor 16 to turn the swing machinery 1.

For robustness, a relief valve 11 for the hydraulic accumulator 10 may be included. Optionally, a relief valve 17 on either side of the swing motor 16 in optional combination with anti-cavitation check valves 18 may be provided. In exemplary systems, the anti-cavitation check valves 18 direct flow back to the swing motor 16 from both the make-up port (connected to the drain line) and the flow dissipated through the swing relief valves 17.

However, in other exemplary embodiments there may not be sufficient flow available for the swing anti-cavitation check valves 18 to prevent cavitation, and therefore a low pressure accumulator 39 can be connected to the tank port on the swing control valve 11. The low pressure accumulator 39 is charged when the swing motor 16 is being powered by either the accumulator 10 or the swing pump/motor 3. The low pressure accumulator check valve 40 prevents flow to the hydraulic reservoir 7 until its cracking pressure has been achieved in the low pressure accumulator 39.

In exemplary embodiments, the swing brake 19 may be actuated via a hydraulic pilot signal from the swing control (e.g., a joystick or the like), resulting in it being released when the swing control is displaced from the zero position and it is applied when the swing control is in the neutral position. Optionally, the swing brake valve on exemplary machines may have a built-in delay function that delays the application of the swing brake 19. This delay may be implemented mechanically, electrically, or via software. Exemplary systems may use a solenoid operated swing brake valve 21 which is actuated via a signal from a controller. In addition, the delay function may be implemented by adding swing brake delay valve 24, an adjustable orifice, to the line that connects the rod side of the swing brake actuator 23 and the hydraulic reservoir 7. This feature allows the release and application of the swing brake 19 at will as opposed to being reliant on the position of the swing control. When the swing brake valve 21 is in the position shown in FIG. 1 the swing brake actuator 23 will be extended due to the force applied by the spring on the piston side of the cylinder, and therefore the swing brake will be applied. When the swing brake valve 21 is actuated the rod side of the swing brake actuator 23 will be connected to the pilot pump 6 and therefore the swing brake actuator 23 will retract, releasing the swing brake. When the swing brake valve 21 is shifted back to the position shown in FIG. 1, the rod side of the swing brake actuator 23 will be connected to the hydraulic reservoir 7 through the swing brake delay valve. The spring on the piston side of the swing brake actuator 23 will begin extending the swing brake actuator 23, reducing the volume of the rod side, and therefore displacing fluid out of the swing brake actuator and through the swing brake delay valve 24 to the hydraulic reservoir 7. The orifice size through the swing brake delay valve 24 and the flow from the rod side of the swing brake actuator 23 will set the pressure in the rod side of the swing brake actuator 23 which will determine the length of delay from the shift of the swing brake valve 21 to the application of the swing brake 19.

FIGS. 2-12 describe the modes of operation of the present invention broken down by the type of motion: swing drive propulsion, swing drive retardation, no movement of swing drive. In the following figures dark arrows indicate a use or dissipation of power while light arrows indicate the flow of power that is being recovered. Please note that, for ease of understanding, all of the figures assume the swing machinery is rotating in the same direction.

In the configuration described above in reference to FIG. 1, there are 3 main modes of propulsion operation: (1) powered solely by the swing pump/motor 3, (2) powered solely by the accumulator 10, or (3) powered by the hydraulic accumulator 10 and the swing pump/motor 3.

Figure 2:
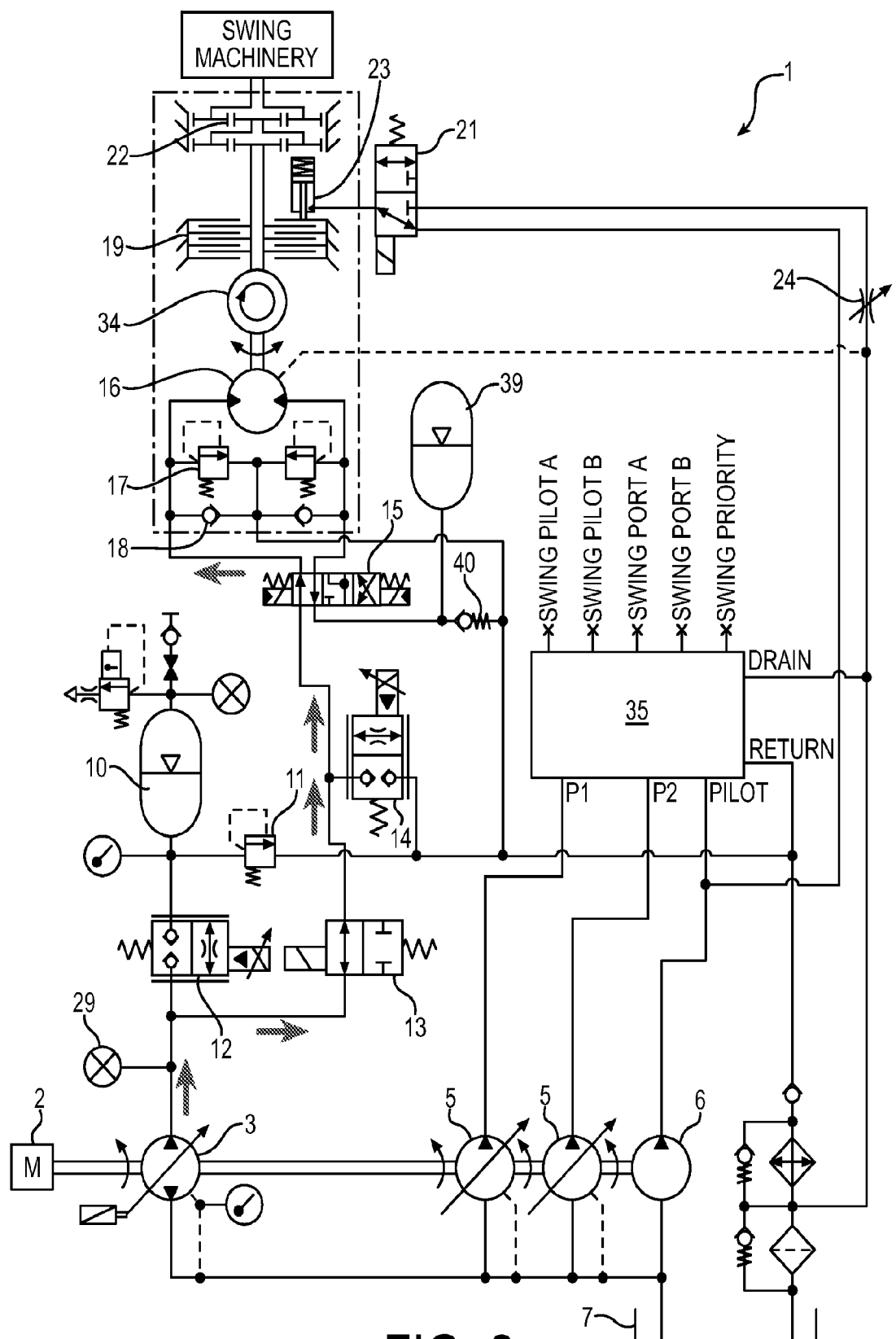
FIG. 2 shows a schematic illustration of the exemplary HSD in a swing propulsion mode using only the swing pump.

FIG. 2 illustrates the mode where the swing motor 16 is solely propelled by the swing pump/motor 3; the dark arrows in the figure is used to illustrate the direction of power flow. To power the swing motor 16, the swing pump/motor 3 is brought on stroke and the swing control valve 15 is shifted to connect the high pressure flow to the appropriate/desired side of the swing motor 16. The displacement of the swing pump/motor, and therefore flow, may be used to control the swing speed. The isolation valve 13 remains in the open position, and the accumulator control valve 12 remains in the closed position.

Figure 3:
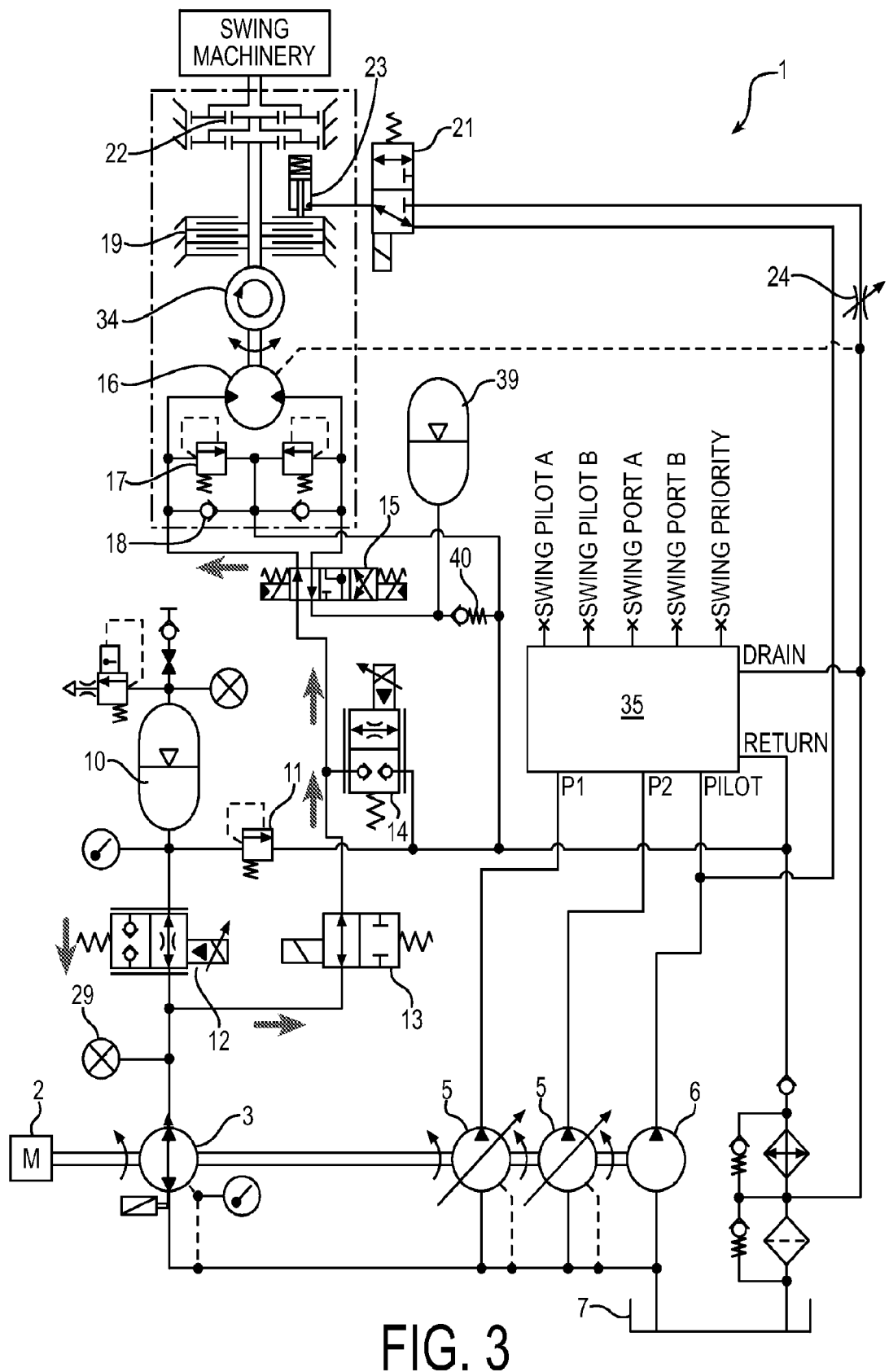
FIG. 3 shows a schematic illustration of the exemplary HSD in a swing propulsion mode using only the accumulator.

A second mode of propulsion uses solely the hydraulic accumulator 10 and is illustrated in FIG. 3 where the accumulator control valve 12 is energized to allow high pressure flow from the hydraulic accumulator 10 to the swing motor 16. The accumulator control valve 12 is controlled so that a specified pressure is achieved across the swing motor 16. This results in a known torque and, given a moment of inertia, a known angular acceleration. Optionally, the accumulator control valve 12 can be controlled based on the pressure measured by the pump pressure sensor 29 to achieve/maintain the required pressure across the swing motor 16.

The swing control valve 15 is energized to connect the high pressure flow to the appropriate side of the swing motor 16 and the swing pump/motor 3 is brought to 0% displacement.

The isolation valve 13 remains in the open position and the dump valve 14 is energized to be in the closed position. The opening of the accumulator control valve 12 is determined based on the desired angular speed of the swing machinery 1, the measured angular speed of the swing machinery 1 reported by the swing speed sensor 34, and the torque required to accelerate the swing drive.

Figure 4:
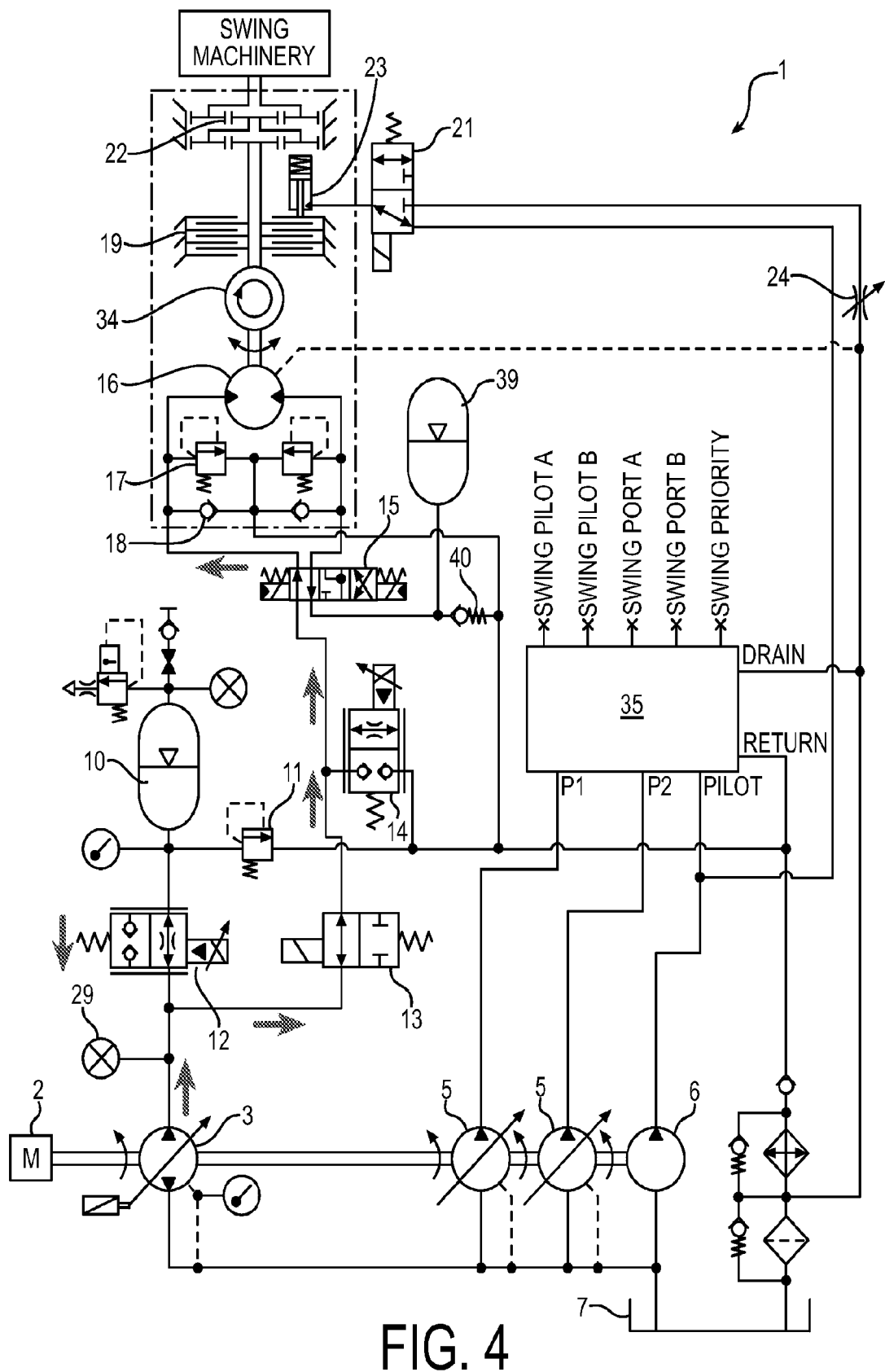
FIG. 4 shows a schematic illustration of the exemplary HSD in a swing propulsion mode using both the swing pump and the accumulator.

The final configuration used to propel the swing drive is illustrated in FIG. 4 where both the hydraulic accumulator 10 and the swing pump/motor 3 are used to provide flow. The accumulator control valve 12 is opened and the swing pump/motor 3 is brought on stroke. The swing control valve 15 is energized to allow the flow to go to the correct side of the swing motor 16; also note that the isolation valve 13 remains in the open position and the dump valve 14 is energized to the closed position, if the dump valve is included in the system. However, it is a distinct possibility that the accumulator control valve 12 will be energized before the swing pump/motor 3 is stroked on so as to minimize the pressure spike required to begin turning the swing drive. The swing angular speed is controlled by controlling the pressure across the swing motor 16, which will control the torque applied to movement of the swing machinery 1. This angular speed may be controlled mostly by the swing pump/motor 3 and partially by the hydraulic accumulator 10, but the direction of rotation is solely determined by the swing control valve 15. It is noted that, by shifting the swing control valve 15 the opposite direction from that illustrated in FIGS. 2-4, the swing pump motor 16 and swing machinery 1 would rotate in the opposite direction.

When the swing drive is being accelerated, the swing pump/motor 3 and/or the accumulator 10 will be used. However, when rotating at a constant speed, it is preferable to use the swing pump/motor 3 as the pressure across the swing motor 16 will be minimal. If the accumulator 10 were used when rotating at a constant speed a large portion of the energy in the flow from the accumulator 10 would be dissipated across the accumulator control valve leading to a relatively inefficient use of energy.

A benefit of decoupling the swing function from the main pumps 5 is that the metering losses through the main swing valve 35 will be reduced. For example, a typical system may have the swing function on the same pump as the boom and arm functions. Unfortunately, the required pressure for each of those functions is not always the same, and therefore the flow from the single pump powering those functions must be metered down to each function's required pressure. By decoupling the swing function from the main pump the amount of flow that must be metered is reduced, and there is also one less function which can set the operating pressure for the pump. Finally, on exemplary swing circuits, the metering losses from the swing pump/motor 3 may be negligible when accelerating the swing machinery 1 because the path from the swing pump/motor 3 to the swing motor 16 may be controlled with on-off valves which direct the flow without metering it. In other words, there are no flow restrictions in the path from the swing pump/motor 3 to the swing motor 16.

Referring now to FIGS. 5-10, there are 4 primary modes of swing movement braking: (1) braking via the accumulator 10, (2) braking via the dump valve 14, (3) braking via the swing pump/motor 3 and the accumulator 10, and (4) braking via the swing pump/motor 3 and the dump valve 14. Additionally, two more modes of operation use the dump valve 14 to decelerate the swing drive while using the isolation valve 13 to disconnect the swing pump/motor 3 and accumulator 10 from the rest of the circuit; the swing drive can continue braking via the dump valve 14 while the swing pump/motor 3 either charges the accumulator 10 or the accumulator 10 is used to assist the engine 2 to power other functions.

Figure 5:
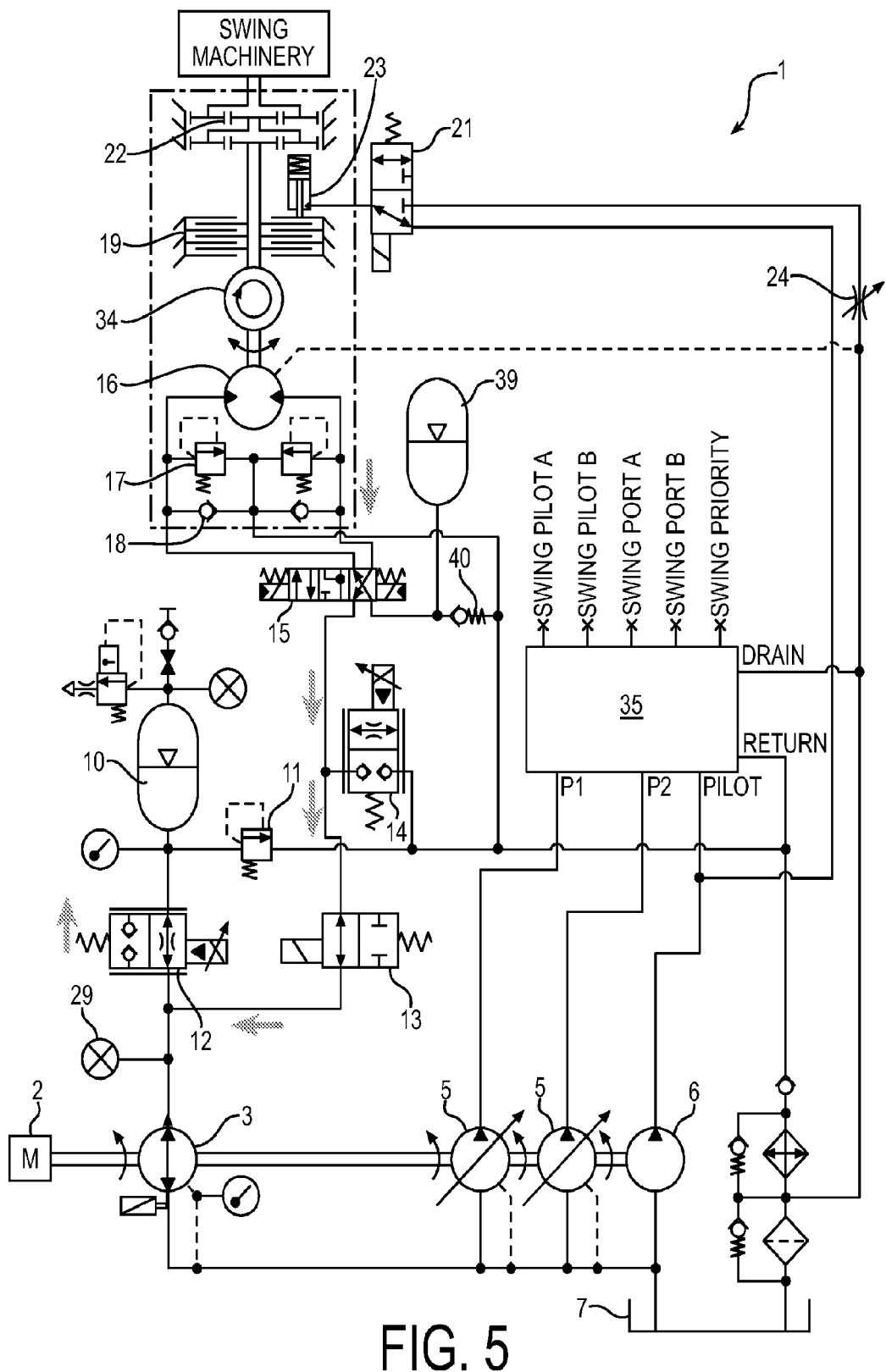
FIG. 5 shows a schematic illustration of the exemplary HSD in a braking mode using only the accumulator.

FIG. 5 illustrates the case where the accumulator 10 is used to decelerate the swing machinery. The swing control valve 15 shifts so as to connect the previously low pressure side of swing motor 16, now operating as a pump, to the high pressure side of the circuit. The swing pump/motor 3 is de-stroked to prevent flow from going to that part of the circuit. The accumulator control valve 12 is preferably fully shifted to the open position to connect the hydraulic accumulator 10 to the high pressure side of the swing motor 16 creating a pressure drop across swing motor 16 generating a torque to retard the motion of the swing machinery. Optionally, the accumulator control valve 12 flow area may be proportionally reduced to create a higher pressure drop across the swing motor 16, but this would reduce the amount of swing energy that can be captured. The pressure drop required across the swing motor 16 is determined from the required rate of deceleration and the moment of inertia of the swing drive. When braking with the accumulator 10, the required pressure drop across the swing motor 16 must be equal to the pressure in the accumulator 10 plus the pressure drop across the accumulator control valve 12 minus the pressure of the low pressure accumulator 39. Using the ideal orifice equation, the area opening of the accumulator control valve 12 can be calculated by knowing the required pressure drop across it as well as the flow from the swing motor 16 as computed, for example, via the measurements from the swing speed sensor 34. The dump valve 14 is energized to be in the closed position, and the isolation valve 13 remains in the open position.

One instance where the accumulator control valve 12 would not be necessary would be if the accumulator 10 was large enough and the pre charge high enough where the accumulator 10 pressure was always "close enough" to the required braking pressure. This would entail an accumulator 10 that could absorb one or more swing cycles where the pressure would not change dramatically while filling with fluid. To more easily and more economically achieve this goal the accumulator 10 could be realized by either using multiple accumulators 10 or an accumulator 10 composed of a traditional accumulator 10 connected to a gas bottle. Having multiple accumulators 10 would increase the amount of energy that can be stored. An accumulator 10 with a gas bottle would allow for a very large volume of gas, at a high pre-charge, where stored energy, or a reduction in gas volume, would not lead to a huge increase in pressure.

Figure 6:
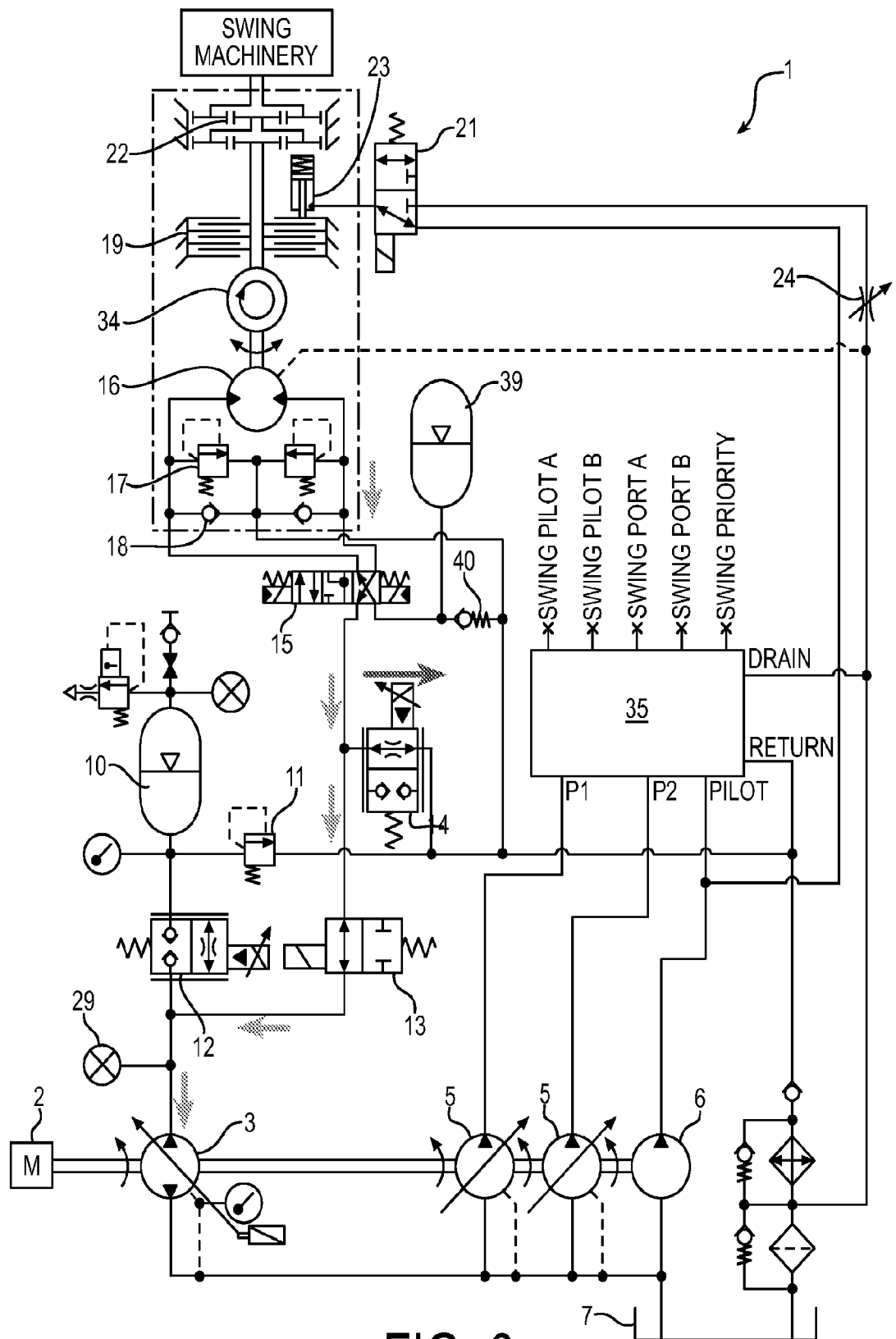
FIG. 6 shows a schematic illustration of the exemplary HSD in a braking mode using the swing pump and dump valve.

Turning to FIG. 6, the swing drive energy is slowed down by providing a resistive torque via the swing motor 16 acting as a pump generating a flow at pressure. The pressurized flow is directed through the swing pump/motor 3 which is stroked over center to function as a motor, thus providing power to the shaft of the main pump 5. The main pump/motor 5 in turn creates a pressurized flow that can be used to power other functions connected to the main pump (for example, boom, bucket, arm, etc.).

The pressure drop across the swing motor 16 may be controlled by varying the swash angle of the swing pump/motor 3 (which, in this case, is depicted as a hydraulically controlled variable displacement pump, but may be any suitable type including, for example, an electronically-controlled displacement pump) and the opening of the dump valve 14. The amount of flow directed over the dump valve 14 is controlled by the swash angle of the swing pump/motor 3 and the pressure drop is controlled by the dump valve. The pressure drop across the dump valve 14 and the pressure drop across the swing pump/motor 3 are the same because they are in parallel. The flow to the dump valve 14 is wasted energy, but this can be minimal, as only a small amount of flow may be directed there. The distribution of flow between the swing pump/motor 3 and the dump 14 will be dictated by the amount of power the engine shaft can absorb as reported by the engine control unit. The power recovered by the engine shaft is directly proportional to the swing pump/motor 3 pressure drop, rotational speed, and displacement; the pump displacement being the most readily available variable to change. Once the displacement of the pump is known, the flow to the swing pump/motor can be calculated using the engine 2 speed. Because the total flow from the swing motor 16 is known, due to the swing speed sensor 34, the flow through the dump valve 14 can be determined. The isolation valve 13 remains in the open position, and the accumulator control valve 12 remains in the closed position.

In an alternate scenario the pump/motor 3 can be used recover energy back to the mains pumps 5, but instead of using the dump valve 14 to set the pressure, the swing relief valves 17 can instead be used to set the pressure. In this case the pump/motor would be set to a swash angle where the pressure, as measured by the pump pressure sensor 29, is equal to the relief valve setting. As in the previous scenario the maximum (negative) swing pump/motor 3 angle would be dictated by the amount of energy the main pumps 5 can recover, as reported by the engine control module. In this case some flow would be wasted, but through the swing relief valves 17 as opposed to the dump valve 14. This mode of operation offers a benefit: the dump valve 14 may not need to be included in the system, resulting in lower cost and more robust control as it requires one fewer component to control in tandem with other components.

Figure 7:
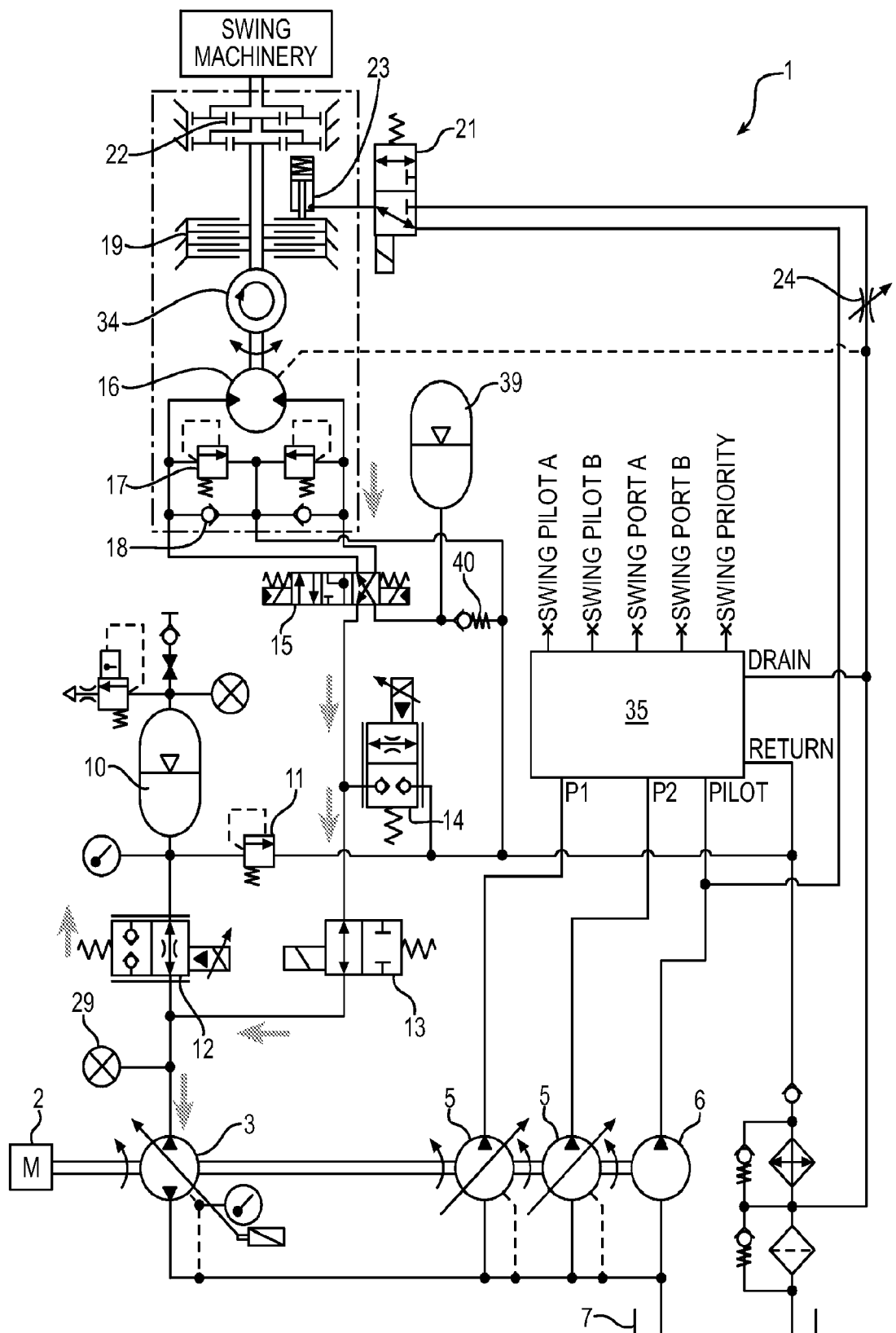
FIG. 7 shows a schematic illustration of the exemplary HSD in a braking mode using the swing pump and accumulator.

FIG. 7 illustrates the situation where both the swing pump/motor 3 and the hydraulic accumulator 10 are used to retard the swing motion of the swing machinery. This mode of braking will occur when the other functions on the machine are operating, and the accumulator pressure is less than the required braking pressure. As stated before, the pressure differential across the swing motor 16 controls the torque, and therefore the deceleration rate. The pressure differential across the swing motor is set by the pressure of the accumulator 10 plus the pressure drop across the accumulator control valve 12. The distribution of flow, and therefore power, between the accumulator 10 and the swing pump/motor 3 is determined by the current load on the engine; the engine may not recover more energy than it is supplying or else possible damage and other negative consequences may occur. Once the flow distribution is determined, the accumulator control valve 12 flow area and the swing pump/motor 3 are adjusted to obtain the required pressure drop and flow distribution to maximize the recovered energy. Compared to the operation described in FIGS. 5 and 6, the operation in FIG. 7 requires only a portion of the flow to be metered, and even then only some of the pressure is dissipated before it is stored in the hydraulic accumulator 10. The isolation valve 13 remains in the open position and the dump valve 14 is energized to be in the closed position.

Figure 8:
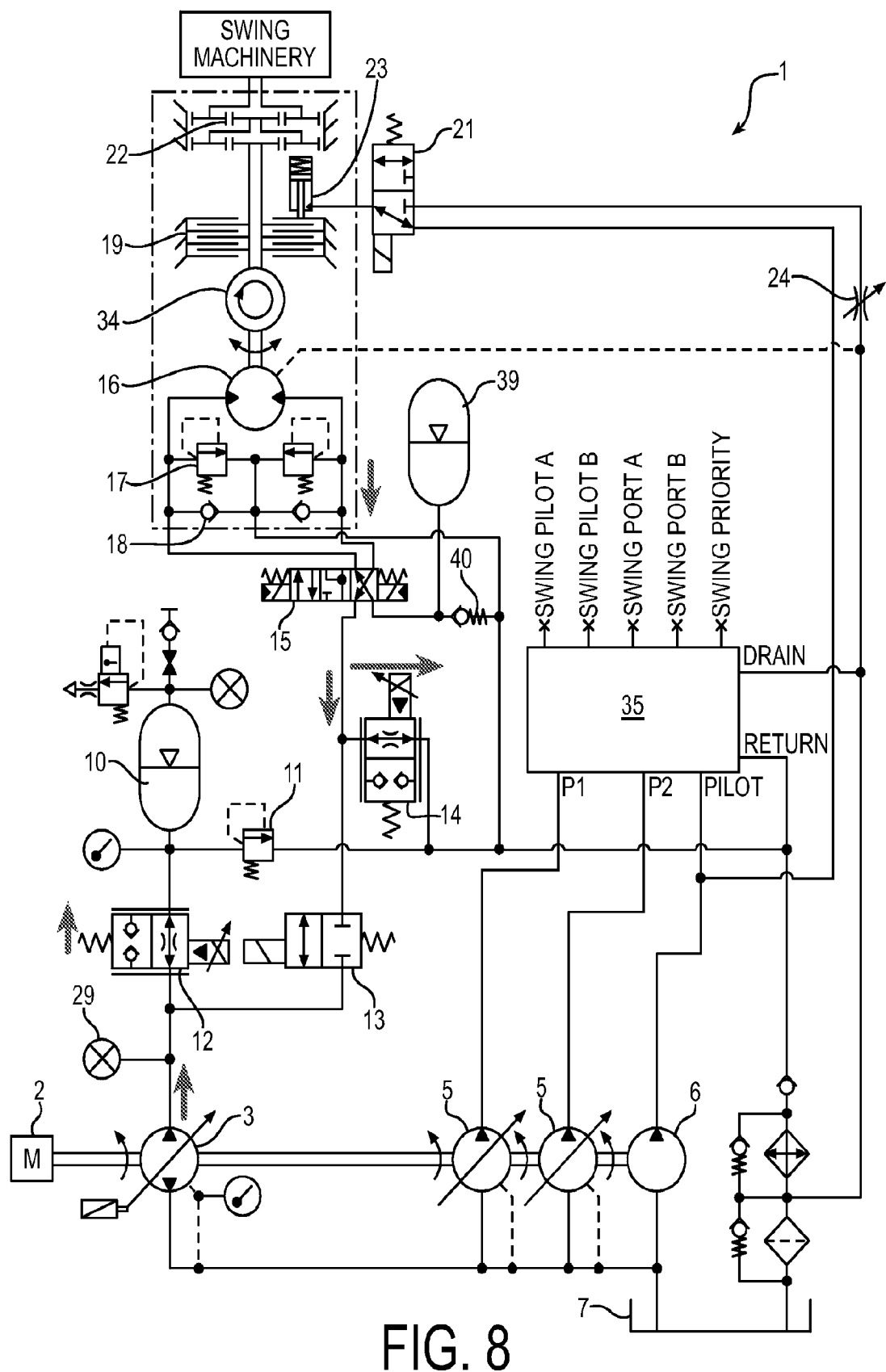
FIG. 8 shows a schematic illustration of the exemplary HSD in a braking mode using the dump valve while charging the accumulator in parallel.
Figure 9:
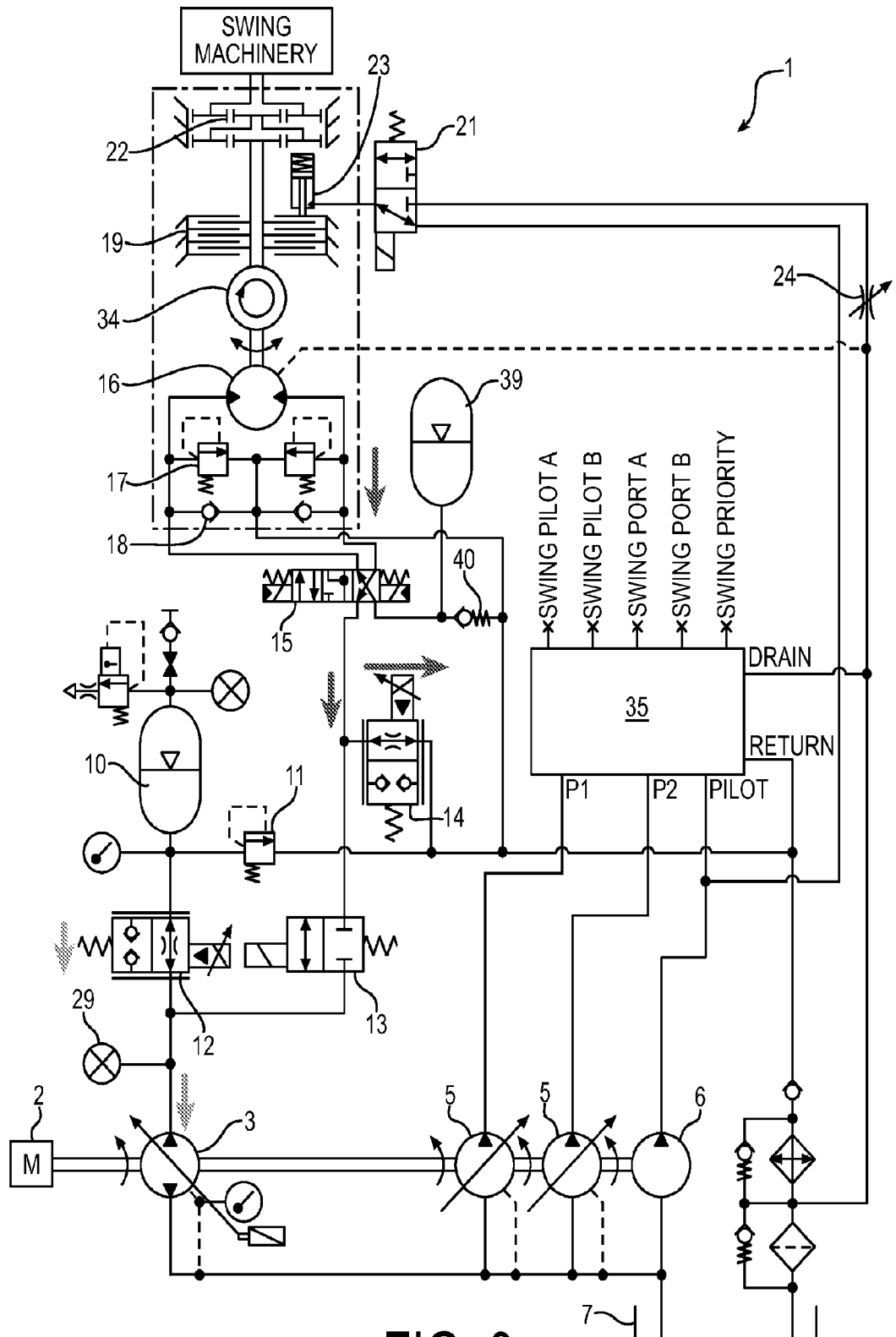
FIG. 9 shows a schematic illustration of the exemplary HSD in a braking mode using the dump valve with the accumulator powering other functions in parallel.
Figure 10:
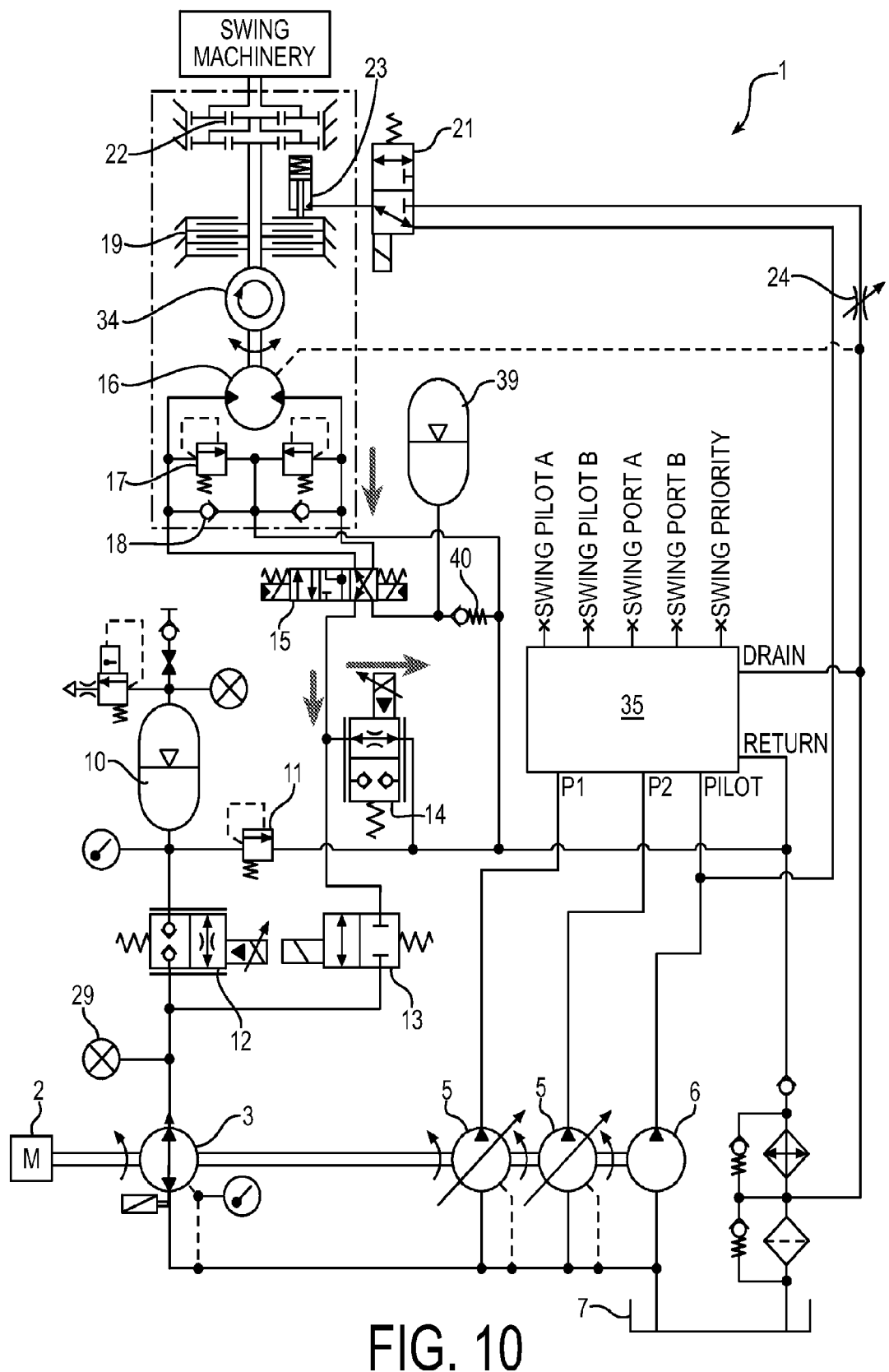
FIG. 10 shows a schematic illustration of the exemplary HSD in a braking mode using only the dump valve.
Figure 11:
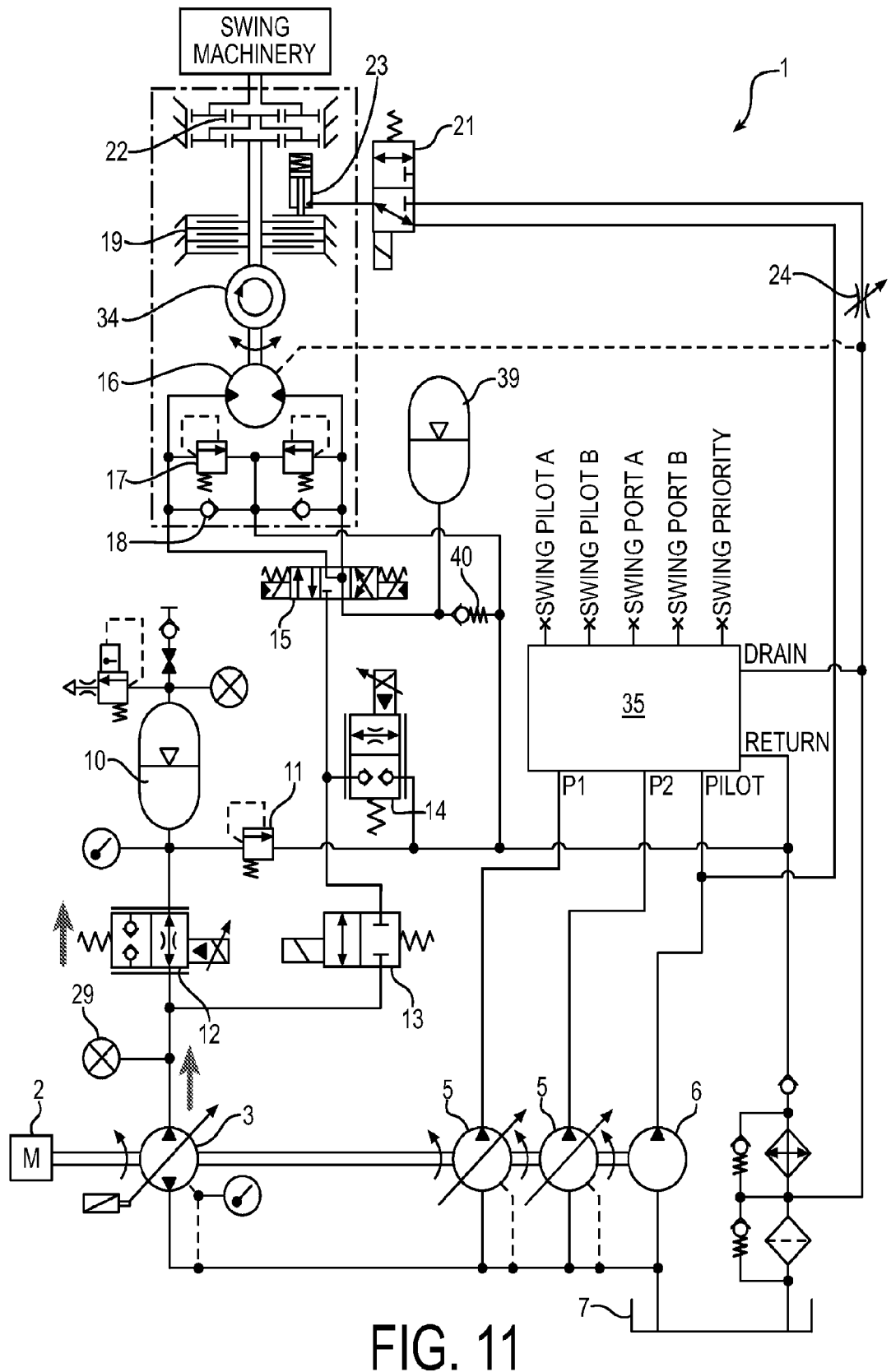
FIG. 11 shows a schematic illustration of the exemplary HSD in no motion mode while charging the accumulator.

When the swing movement decelerates to a very low speed, the available kinetic energy to capture is minimal. Thus, it may be deemed more valuable to perform other operations with the pressure in the hydraulic accumulator 10, or to fill the accumulator to a full charge. FIGS. 8-10 illustrate these cases. In these 3 cases, the remaining braking of the swing motor 16 is done by metering the flow across the dump valve 14. In this mode, the isolation valve 13 is in the closed position.

The case in FIG. 8 shows the braking of the swing motor 16 via the dump valve 14, while at the same time the swing pump/motor 3 is stroked to charge the accumulator 10. The accumulator control valve 12 is opened to connect the hydraulic accumulator 10 to the swing pump/motor 3.

In FIG. 9, the braking is achieved in the same way as in FIG. 8. The pressure in the hydraulic accumulator 10 is used to power other functions by stroking the swing pump/motor 3 over center to act as a motor. This will supplement the available torque in the engine shaft which can be used by the main pump/motor 5 to power other functions (for example, boom, bucket, arm, etc. . . . ).

FIG. 10 shows braking via the dump valve 14 as in FIGS. 8 and 9. When the hydraulic accumulator 10 is full, and there is no demand in the rest of the system, then the swing pump/motor 3 is de-stroked to 0% displacement, and the accumulator control valve 12 remains closed.

In FIGS. 8-10 if the swing control valve 15 instead has a closed center configuration, as depicted in FIG. 23, then the braking can be achieved by solely returning the swing control valve 15 to the center position where all of the ports are blocked. This would result in the swing motor 16 decelerating at the swing relief valve 17 pressure as opposed to a variable pressure as allowed by use of the dump valve 14. Flow would leave the high pressure port of the swing motor 16, travel through the swing relief valve 17 and then return to the low pressure side of the swing motor through the swing anti-cavitation check valve 17. In this mode the swing motor 16 can be braked independently if the accumulator 10 is either charged by the pump 3 or the accumulator 10 is used to power the swing pump/motor 3 to power other functions. Further, when using a closed center swing control valve 15 the isolation valve 13 and dump valve 14 may be omitted from the system.

Figure 12:
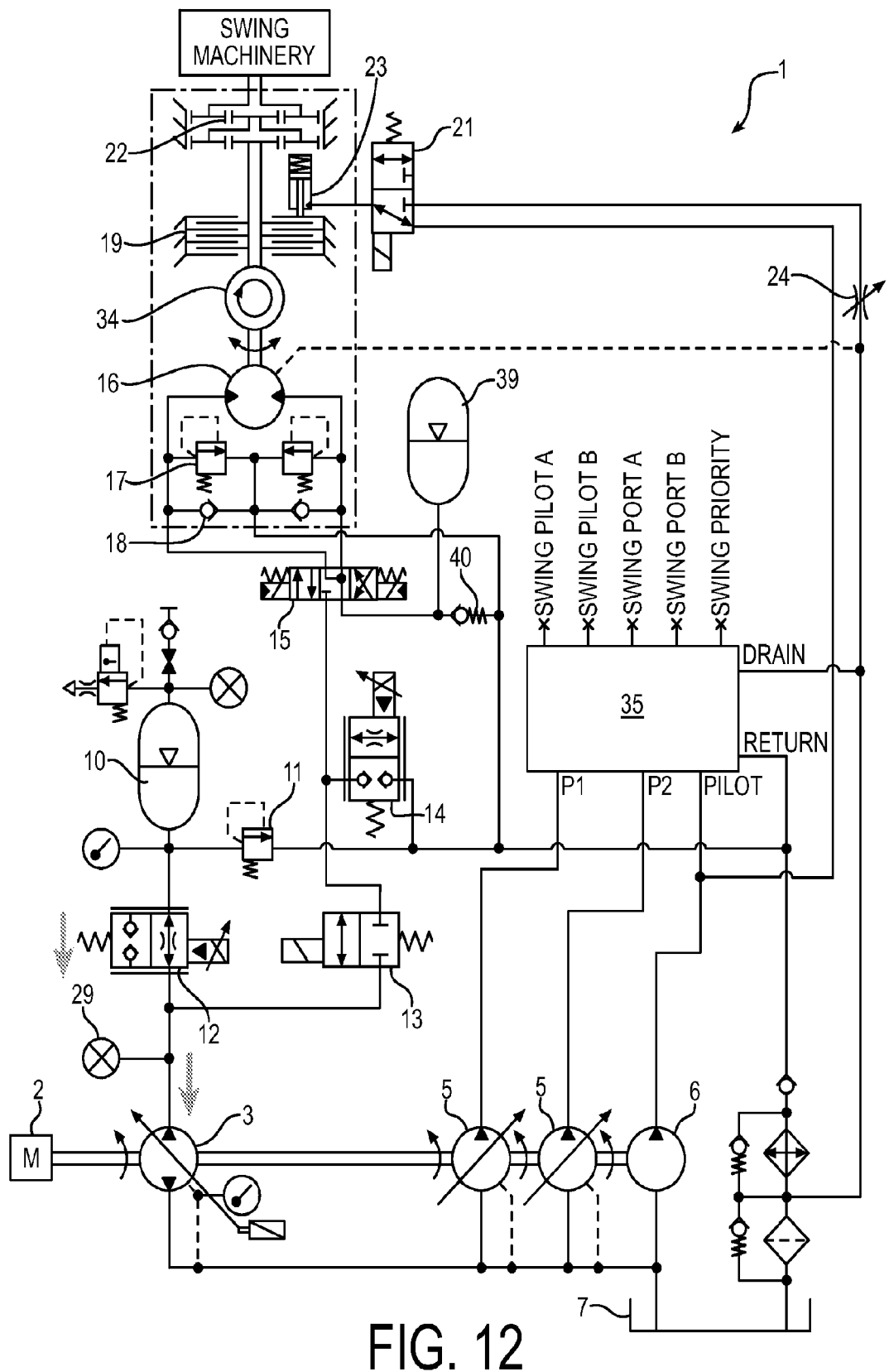
FIG. 12 shows a schematic illustration of the exemplary HSD in no motion mode while using the accumulator to power other functions.

There are two final modes of operation illustrated: ones in which the swing motor 16 is already stopped. One, shown in FIG. 11, involves using the swing pump/motor 3 to charge the hydraulic accumulator 10 if the charge was incomplete during braking. The accumulator charging can occur whether other functions are being performed or not, and there should not be a hydraulic efficiency degradation as the hydraulic accumulator 10 is on a separate circuit from the other work functions. If the hydraulic accumulator 10 is fully charged when the swing operation begins, it can be used to provide the initial torque necessary to accelerate the swing machinery. The power required from the engine 2 to charge the hydraulic accumulator 10 can be varied by adjusting the swash angle of the swing pump/motor 3. The pressure of the swing pump/motor 3 is set by the pressure of the accumulator, but the fill rate, a product of the flow rate from the swing pump/motor 3, of the accumulator can be controlled by varying the swash angle of the swing pump/motor 3. In the case of a high demand from the engine, this pressure can also be used to aid the movement of other functions as seen in FIG. 12. In both FIG. 11 and FIG. 12, the isolation valve 13 is energized to be in the closed position.

As discussed above, the accumulator 10 can be used to supplement the engine 2 when the main pumps 5 are driving other functions such as the boom, arm, or bucket. This will reduce the amount of power from the engine and allow for more intelligent power control by operating at a more efficient operating point. Further, when the engine power is at a peak demand the accumulator 10 can be used to shave the power peaks, or load level, so there are not sudden increases in engine power demand. Further, the engine can be managed in a more intelligent way by varying the engine speed to operate at a more efficient point for the current operation. For example, when the power demand is lower the speed of the engine can be decreased while operating at a higher torque which often leads to greater engine efficiency.

Figure 13:
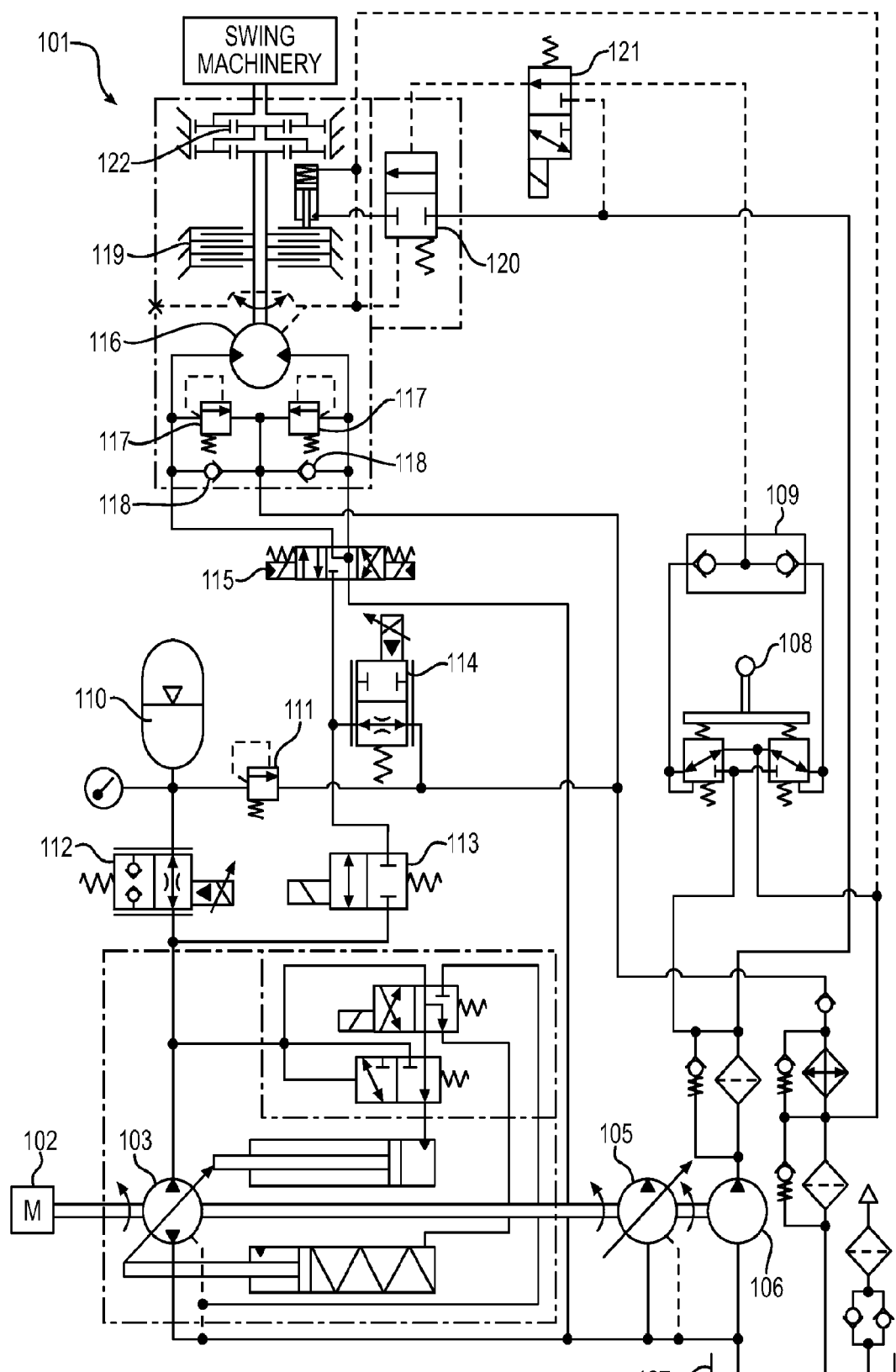
FIG. 13 shows a schematic illustration of another exemplary HSD.

Turning now to FIG. 13, depicted is another exemplary HSD system shown at 101. The HSD is substantially the same as the above-referenced HSD 1, and consequently the same reference numerals but indexed by 100 are used to denote structures corresponding to similar structures in the HSD. In addition, the foregoing description of the HSD 1 is equally applicable to the HSD 101 except as noted below. Moreover, it will be appreciated upon reading and understanding the specification that aspects of the HSDs may be substituted for one another or used in conjunction with one another where applicable.

The variable displacement pump has been illustrated more explicitly as a hydraulically controlled variable displacement pump (however, this is merely used as an example). The pump displacement control valves 104 may include a pressure compensator to limit pressure buildup in the system. This function may alternatively be accomplished with a pressure relief valve on the main hydraulic line.

Figure 14:
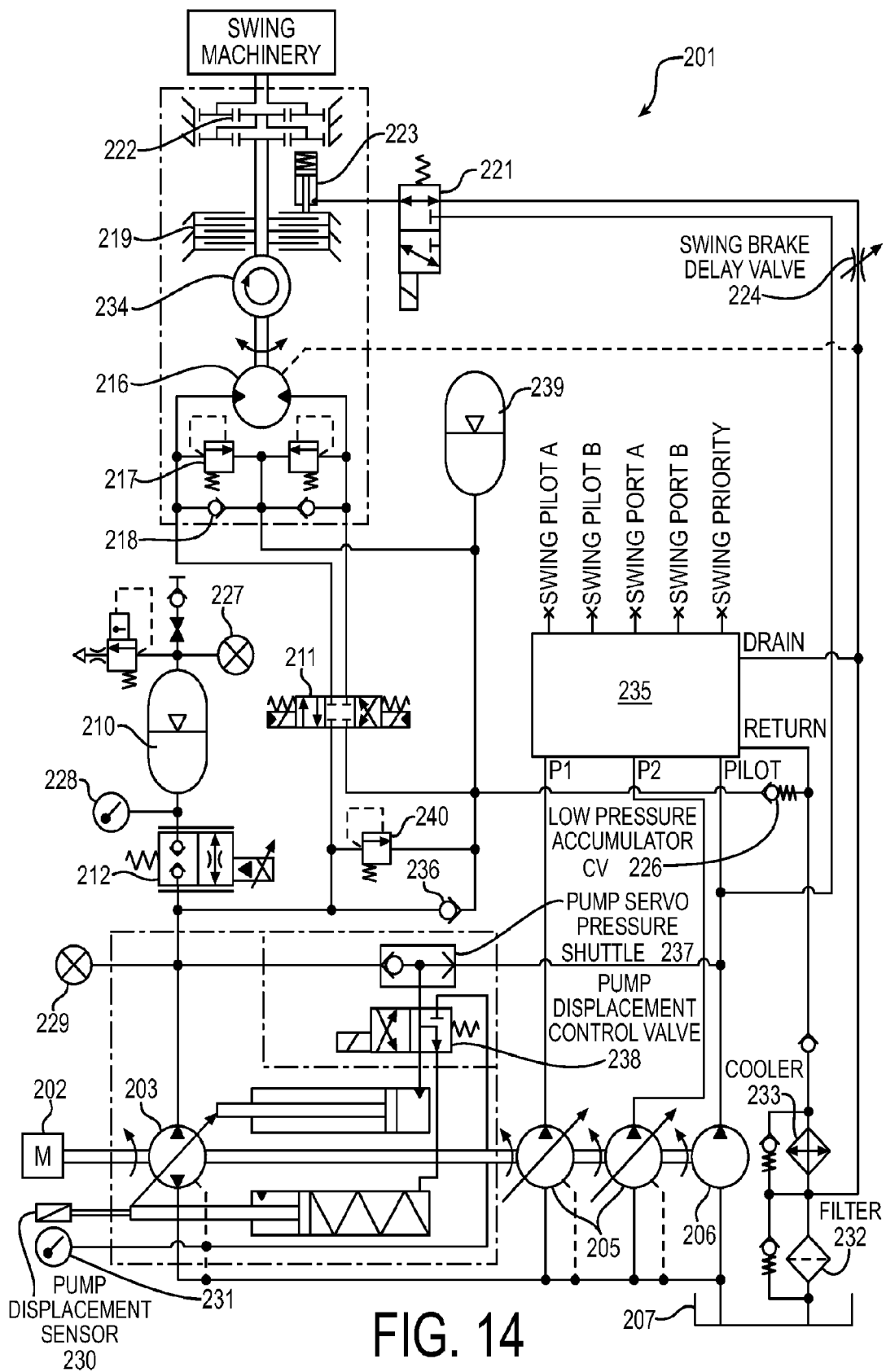
FIG. 14 shows a schematic illustration of another exemplary HSD.

Turning now to FIG. 14, illustrated is another exemplary embodiment of an HSD 200 with a different configuration of hydraulic components and how they are connected. Most notably, the HSD 200 includes a servo pressure shuttle allowing for an external source of pressure to drive the pump displacement when going over center; an anti-cavitation check valve 236 for eliminating cavitation upon going over center; and a relief valve 240 for reducing pressure spikes faster than a pump displacement pressure compensator. The HSD 200 is substantially the same as the above-referenced HSD 1, 100 and consequently the same reference numerals but indexed by 100 are used to denote structures corresponding to similar structures in the HSD. In addition, the foregoing descriptions of the HSD 1, 100 is equally applicable to the HSD 201 except as noted below. Moreover, it will be appreciated upon reading and understanding the specification that aspects of the HSDs may be substituted for one another or used in conjunction with one another where applicable.

Several considerations should be taken into account in order to prevent unnecessary wear and premature failure of hydraulic components.

There are tradeoffs between using a pressure compensator on the pump displacement and a relief valve. A pressure compensator creates a "fake signal" that overrides the command from the displacement valve 238 when the pressure rises too high which forces the displacement of the pump to be lower. This means that there can be a momentary loss of control of the displacement of the pump in order to try and get the pressure controlled. This is also slow because the movement of the swash plate from a static position is generally not as quick as a relief valve. A relief valve, on the other hand, is very quick to react to pressure spikes, but since the flow is simply sent to tank, the flow and power is wasted. It can be beneficial to use either of the above mentioned options, or possibly both in tandem; it depends on the situation and goals of the circuit, and one having ordinary skill in the art can make this selection after reading and understanding the present disclosure.

In the case of the hydraulic hybrid setup, the amount of working fluid in the system can vary due to the storage of fluid in an accumulator rather than simply being recirculated through the pump; this is unlike a conventional system where the flow into the system is nearly the same as the flow out of the system. This changing volume of fluid can lead to cavitation. Therefore, when using an over center unit, protection may be incorporated to prevent cavitation damage which will decrease the life of the hydraulic components. The damage can be mitigated through the use of a make-up check 236 connected to a slightly higher than atmospheric return line. The relief valve 240 or pressure compensator may help on the high pressure side. The addition of an anti-cavitation check valve 236 can be used to protect the low pressure side.

In the case of the hybrid system versus a conventional system, cavitation protection on the conventional system is generally fed from the return line, which is at a slightly higher pressure than the tank 207 due to the pressure rise through the cooler 233 and filter 232. This is generally sufficient due to the fact that the conventional system uses the same amount of oil coming into the swing motor 216 as to out of it. The only makeup required is a small amount from case leakage in the motor. In exemplary hybrid systems, flow can be directed to the accumulator 210 instead of back to tank 207, therefore the volume can change dramatically in the circuit, thus a low pressure accumulator 239 is helpful to prevent cavitation.

Another technique to enhance cavitation protection is the use of a low pressure accumulator 239 that is held at a higher pressure than the reservoir 207 and can be used for all of the make-up checks. As shown in FIG. 14, the accumulator 239 is connected to supply the inlet side of anti-cavitation valves 218 and to draw fluid from the pressure relief valves 217. The accumulator 239 is also connected to one input of control valve 211 directly (i.e. between the control valve input and the check valve 226 connected to the reservoir 207), and to the second input of the control valve by check valve 236 (i.e. between the control valve and the pump 203).

A slight adaptation of this configuration is to position the check valve 226, which holds pressure in the low pressure accumulator, over the return line slightly more downstream to allow the low pressure accumulator to feed the make-up checks on the swing motor and anti-cavitation checks in the system as well.

Using an over center pump in a hydraulic circuit can pose some risks if there is not ample pressure immediately when transitioning over center. An anti-cavitation check and a relief valve can be added to the circuit to combat this issue, pulling from the low pressure reservoir when necessary to prevent damage, while not sacrificing the mechanical movement of the displacement control.

When attempting to cross over the zero displacement point rapidly, there can also be a lack of pressure momentarily, which when the outlet pressure is used for the displacement, this can cause a delay in the movement of the swash plate. In particular, pump displacement control using outlet pressure for the displacement valve, and a bias spring on the swash plate which biases the pump towards full displacement should generally have ample pressure to control swash angle. However, when the pump 203 is required to go over center the displacement control pressure is now set by the incoming flow and may drop below an acceptable level for controllability of the swash plate. At this point the bias spring would take over and bring the pump back towards zero displacement, which is in the direction of full displacement. This is the opposite direction of the commanded displacement which results in taking much longer to move the swash plate to the desired angle.

This issue can be combated with a servo pressure shuttle 237 selecting between pump outlet and another pressure source; in FIG. 14 this is shown as a pilot pump 236. Positioning a shuttle valve 237 that selects the higher pressure between the pump 203 outlet and a secondary pressure source (e.g., from a pilot pump 206) will allow a sufficient pressure to always be available to control the swash angle of the pump 203. The pressure of the secondary source may not need to be the same pressure. For example, the pilot pump 206 may only output about 500 psi, far short of the pressure on the pump 203 outlet. With that in mind, the displacement is still able to be pushed by that pressure, thus control of the displacement is still maintained.

Response time and robustness are particularly important in an electronic integration into a hydraulic system for several reasons. A hydraulic system is by itself very robust, but added electronics provide additional components that can fail. Therefore, increasing the robustness of the electronic system helps to make the entire system more comparable to that of a base hydraulic system. Response time of an electronic system is generally slower than that of a comparable pure hydraulic system because it takes time to sense the command and time to actuate components. In contrast, in a conventional system the hydraulic fluid and pressure immediately propagates to the actuators.

Figure 18:
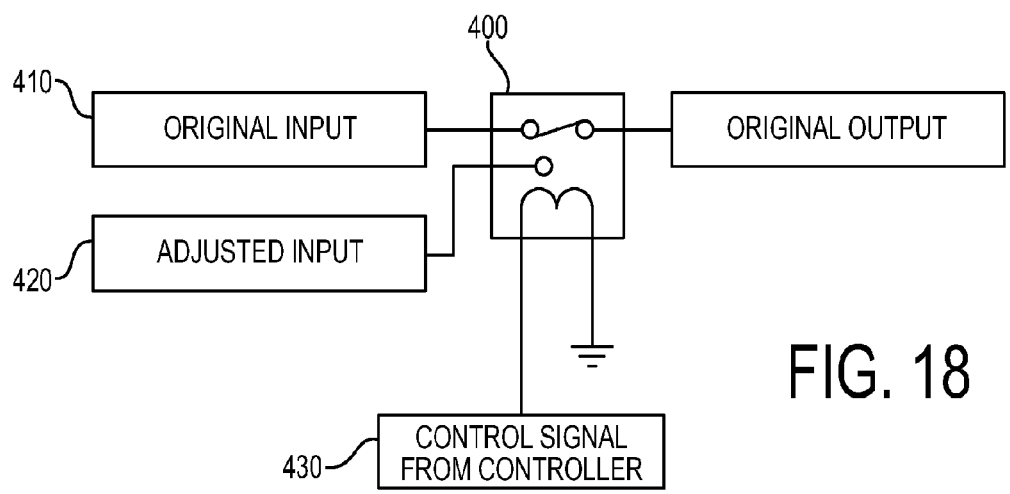
FIG. 18 shows an example of a relay that may be incorporated into exemplary or conventional systems in order to easily retrofit an existing system.

In a retrofit, it may also be necessary to change signals being sent to the stock controller in order to change the system reaction. Because it is not always possible to change a stock controller's software, a relay 400 can be used to change a signal where necessary, and may incorporated on any of the embodiments described herein with any hydraulic architecture incorporating an electronic control. In one embodiment, shown in FIG. 18, the relay 400 can be connected to pass through the stock system signal 410 and another input 420 can be connected to pass through either a fixed desired command or a variable command depending on the situation. The relay may be actuated by a third input 430 which, when changed, will switch between the two inputs and pass only one to the controller. The failure mode of this relay, therefore, will be to pass through the initial value, as shown, which allows for a robust design. The relay will also allow a secondary signal be sent through to the controller when desired.

Another way to accomplish this would be to sense the output from a sensor that would normally have been connected to a stock controller and interrupt it. This signal can be sent out as read, or it can be altered to match the desired commands of the retrofit application.

Figure 15:
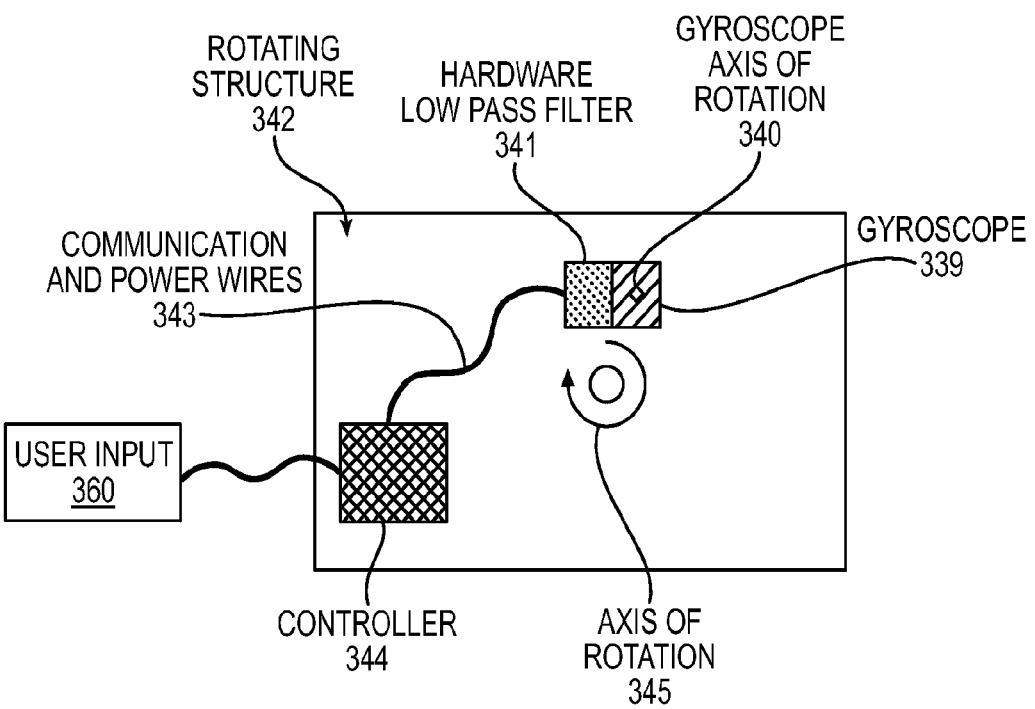
FIG. 15 shows a schematic of an exemplary hydraulic machine having a gyroscope fixed to a rotating structure.
Figure 16:
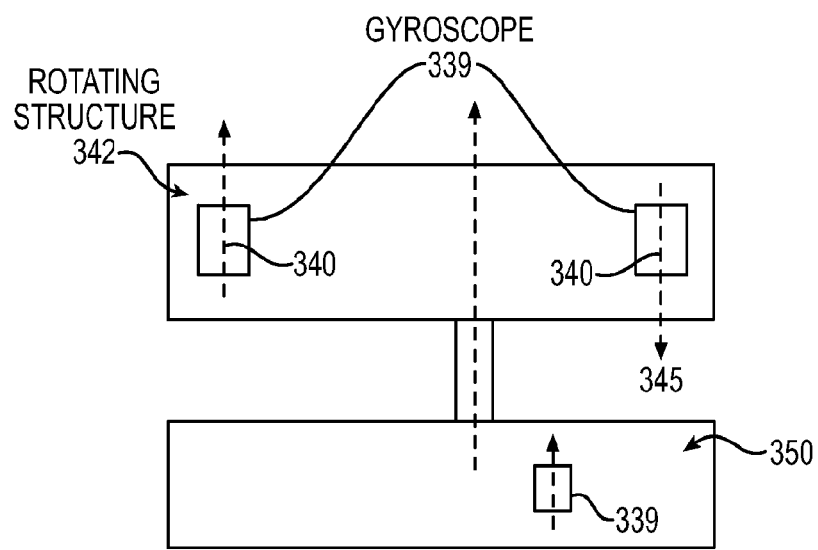
FIG. 16 shows another exemplary hydraulic machine having two gyroscopes fixed to a rotating structure and one fixed to an undercarriage.

Turning now to FIGS. 15 and 16, a top schematic view of an exemplary hydraulic vehicle system is shown in FIG. 15 with a single gyroscope while FIG. 16 shows a side schematic view of an exemplary hydraulic vehicle system with two gyroscopes. It should be noted that exemplary systems including one or more gyroscopes may be combined with any of the previously-discussed HSDs, but may also be used with other hydraulic architectures.

Applying electronic control to hydraulically controlled devices unlocks numerous control opportunities not previously available. However, these control opportunities often also require additional information regarding the state of the device such as speed, position, pressure, etc. In developing additional control opportunities for the swing drive of a material handling device, such as an excavator, measuring and using the swing speed is useful. Acquiring the swing speed of the material handling device can be done in a number of ways whether it be measuring the speed of the device directly or by measuring some related quantity, such as the speed of the swing motor, and computing the expected swing speed.

When developing electronic controls for a new platform or vehicle the requisite sensors can be integrated into the design intelligently and at minimal cost. However, if the electronic controls system is being retrofit, the integration of sensors may not be a trivial task, especially using a typical method to measure a quantity. For example, the swing speed of a material handling device is often measured by computation based on the physical parameters of the gearbox and the measured speed of the swing motor via a hall effect speed pickup sensor. In a retrofit case there may not be a location on the swing motor conducive to a hall effect speed pick up sensor and therefore another method is required. In exemplary embodiments, therefore, a gyroscope is used to directly measure the swing speed of the material handling device in either a retrofit or a new platform. One or more gyroscope sensors may be fixed in an appropriate orientation to the upper carriage of a material handling device and connected to an electronic controller through passive electronics to filter the signal where the electronic controller interprets the measured signals, determines a speed, and uses this information to perform other functions. A variety of embodiments exist that vary in complexity, features, and robustness.

The gyroscope 339 is fixed to the rotating structure (e.g., upper carriage of an excavator) 342 where the gyroscope axis of rotation 340 is mounted parallel to the axis of rotation 345, but not necessarily coincident (although it may be coincident).

The gyroscope 339 may or may not be combined with a hardware low pass filter 341 which will smooth and/or delay the measured angular velocity before passing an output to the controller 344 through the communication and power wires 343. The low pass filter 341 may provide a cleaner signal to the controller. Using passive electronics as opposed to software filtering reduces the controller 344 load and is more robust, however a disadvantage is that the filter constants may not be as easily changed or changed on the fly. A hardware low pass filter will delay and modify the signal before the controller 344 has a chance to interpret it and therefore the original content may lost. Therefore, another possibility is for controller 344 to read the output voltage directly without hardware filters and instead apply software filters. This could be beneficial as different levels or varying levels of filtering could be applied based on the operating mode.

The communication and power wires 343 may both power the gyroscope 339 and also allow the gyroscope 339 to send an output signal to the controller 344. Although not illustrated here, the controller 344 may be connected to one or more other sensors, actuators, and/or controllers.

The controller may be connected to a user input/user interface device 360 directly or indirectly to receive commands from a user. For example, the user input may be a joystick or any other known input device used in the art.

Often in electronically controlled applications having an accurate measure of the angular velocity is key in the control algorithm. Unfortunately, gyroscopes of the same type and manufacturing batch often operate slightly differently and this can lead to varying performance and output for the same angular velocity. Therefore, more than one gyroscope may be used. In particular, the gyroscopes may be oriented in opposite directions to obtain an average velocity signal or to check them against each other for potential errors or malfunctions, as shown in FIG. 16 (it is noted that the gyroscope axes of rotation are parallel yet oriented in opposite directions).

A gyroscope measures the angular velocity of a rotating component. Therefore, any location on a rotating body that is fixed with respect to the remainder of the body rotates at the same angular velocity and therefore the location of the gyroscope may be anywhere fixed with respect to the body. This offers significant flexibility in mounting the gyroscope. An alternative approach may be the use of an accelerometer mounted at a known distance away from the axis of rotation. However, any error in the measured distance to the axis of rotation would result in an error when computing velocity, and engine vibration may induce significant noise into the accelerometer. Due to the need to multiply the measured linear acceleration by the distance from the centerline, any measured noise would be amplified at the same rate as the realized linear acceleration, and this may result in a virtually unusable signal. Conversely, engine vibration may cause both linear and angular velocity changes, but it is not amplified by the need for a multiplication factor when using a gyroscope that purely measures the angular velocity.

On a mobile material handling device, the undercarriage 350 having tracks (or wheels) and the upper carriage 342 are able to rotate separately. However, when the material handling device changes the rotation of the tracks without swinging, the gyroscope would detect an angular velocity because the rotation of the upper carriage will change concurrently with the tracks. Therefore, affixing a gyroscope to the tracks and the upper carriage will allow the controller to ascertain the difference between a rotation of the entire machine (tracks and upper carriage) or simply a rotation of the upper carriage.

Figure 17:
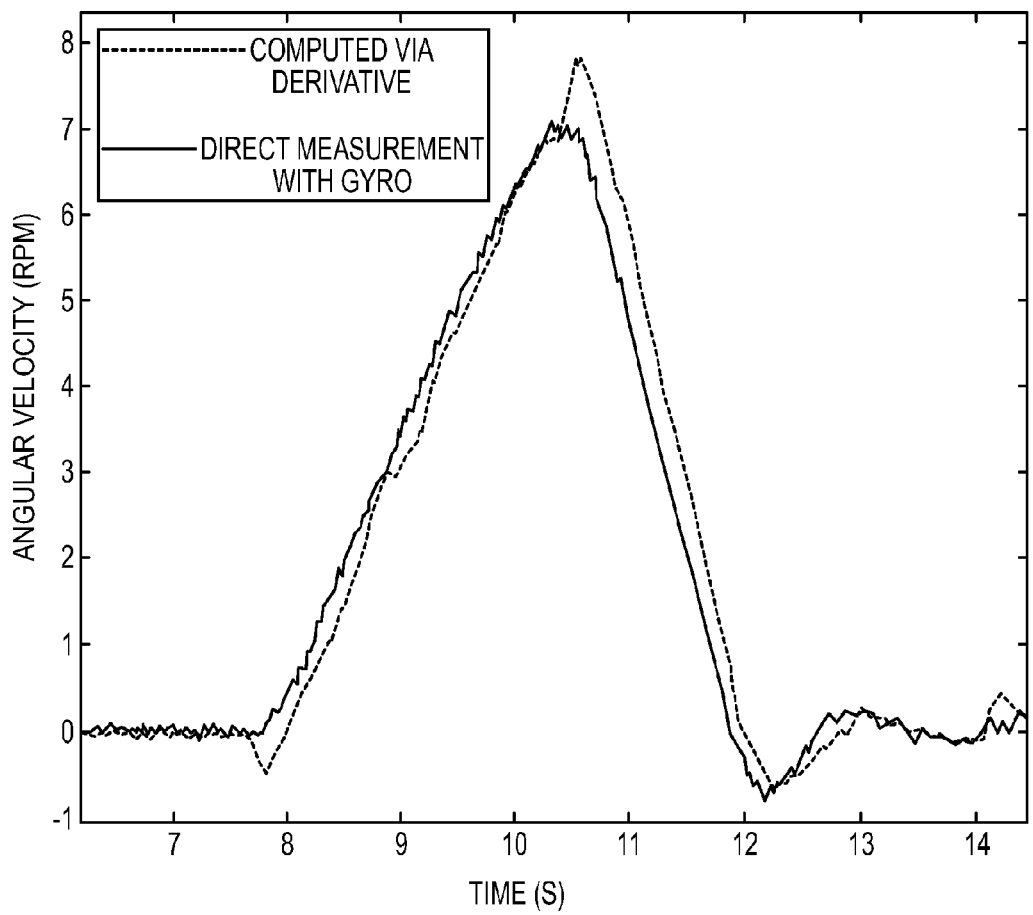
FIG. 17 shows an example of data generated by a gyroscope versus data computed via a derivative of a position measurement.

Measuring the angular velocity directly rather than taking the numerical derivative of the angular position allows the use of acceleration in the control logic by only numerically differentiating a single time. This results in a smoother, more accurate, and less delayed computation of the acceleration signal as shown in FIG. 17. It is noted that the direct measurement using a gyroscope leads the other signal computed via derivatives. This is because—to get a somewhat smooth signal when taking derivatives—a significant filter is required which delays the signal. Conversely, instead of taking a numerical derivative, a numerical integration of the measured angular velocity will result in a position signal. Compared to using an accelerometer a gyroscope is more accurate for a number of reasons. First, only a single integration of the measured angular velocity is required, whereas with an accelerometer two integrations would be required; one to get to velocity and another to get to position. Also, an accurate measurement of the distance from the center of rotation to the accelerometer is required to compute angular acceleration, angular velocity, and angular position; incorrectly computing the angular acceleration would lead to significant error when finally achieving angular position after two numerical integrations. Knowing the position of the upper carriage can be a useful tool in in a return to dig function or some other routine where knowing the position is important.

In summary, benefits to the embodiments discussed with reference to FIGS. 14-17 include:

Obtaining the rotational velocity via direct measurement as opposed to taking the numerical derivative of a rotational position measurement. This results in obtaining a more accurate velocity measurement with less delay.

Simpler to retrofit a vehicle with a gyroscope as opposed to the conventional methods of using a hall effect sensor on the motor or gearbox to determine rotational velocity.

A gyroscope can be applied to any part of the upper carriage of a structure and does not need to be at the axis of rotation. This is because all parts of the upper carriage rotate at the same angular velocity. This provides significant flexibility in mounting location and wiring requirements.

Using a gyroscope may be less costly than some methods of determining rotational velocity such as the aforementioned method of computing the velocity via numerical derivatives from a rotational position measurement.

A relief valve provides a greater response to pressure spikes than a pressure compensator, making it an overall safer and more robust system.

Anti-cavitation check valves can be added to add robustness to a system, especially with an over center pump application.

A servo pressure control of displacement can increase the response time when going over center on a pump.

A low pressure accumulator can be used as a low pressure source to feed the makeup and anti-cavitation checks in a hydraulic circuit with a changing volume.

Relays can be used to provide additional controllability in a retrofit application to interface with a stock controller without changing any software on the controller.

Although not shown in FIGS. 1-13 for clarity, the electronic controller module (ECM) or controller 344 may receive signals from various sensors (e.g., the gyroscope(s)) and controls (e.g., the swing control/joystick), process these input signals, and generate control signals to control the position of the electrically controlled valves of the system.

Further, as mentioned previously, an internal combustion engine (ICE) may drive the electronically or mechanically controlled hydraulic pump which is used to power hydraulic components. Conventionally, the engine speed is set manually by the operator or controller programmer. The engine controller uses speed feedback control in order to maintain the engine at a predefined target speed. The engine speed regulator of the injection pump is set by a lever which is pivoted by a piston-cylinder unit. The engine controller controls the opening of the fuel throttle valve to determine the output torque. The torque may be adjusted by the displacement of the pump according to the power demand of the hydraulic system.

By monitoring required engine power, current engine speed and current output pressure, and comparing this data to predetermined efficiency data, engine speed and engine torque (through control of the pump displacement) may be actively controlled, thereby operating the engine at its most efficient points. Further, energy from the accumulator may be directed to run the hydraulic pump as a motor and assist the ICE in providing power efficiently. By running the engine at its optimal level of efficiency, there is a resultant lower use of fuel and therefore not only lower emissions, but also lower ICE maintenance costs.

The sequence of the engine speed control and torque regulation may be described as follows:

1. The operator may command a certain vehicle operation condition through the joystick movement.
2. The controller receives and interprets the joystick command and, based on the energy storage level in the accumulator, determines the desired engine power output.
3. Through the interpretation of the engine efficiency map, an optimal engine speed will be commanded by the controller (e.g., this may be transmitted to a dedicated engine electronic control unit) to regulate the engine throttle to maintain that desired engine speed.
4. The engine torque is regulated, independent of the engine speed, by means of a displacement control of the hydraulic pumps according to the power demand of the hydraulic system, and is reported through the engine electronic control unit for the purpose of closed loop control.
5. A change of the power demand through joystick command will be interpreted again and the resulting engine power demand change will automatically adjust the engine speed. The engine torque is also adjusted accordingly to match the power demand of the vehicle operation and maintain the engine operating at its most efficient region (i.e. the sweet spot) at new power level.

Because the hydraulic energy can be stored, when the working machine is idling or very small power consumption is needed, the engine can be automatically brought to idle state and can even be turned off automatically to save energy. In order to achieve these energy savings through ICE shut-down (which is done in a manner as to not take away from the usability of the machine), the system is designed so that the hydraulic pump-motor can be used to rapidly restart the ICE. This pump-motor is much more durable than a standard starter on a typical ICE, providing lower maintenance costs in the long run.

Exemplary methodologies or portions thereof may be implemented as processor executable instructions or operations provided on a computer-readable medium (the ECM 244, e.g.). Thus, in one example, a computer-readable medium may store processor executable instructions operable to perform a method that includes one or more of the steps described above.

"Computer-readable medium," as used herein, refers to a medium that participates in directly or indirectly providing signals, instructions or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a processor or other electronic device can read. Signals used to propagate instructions or other software over a network, like the Internet, can be considered a "computer-readable medium."

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Other forms may also be used.

"Signal," as used herein, includes but is not limited to one or more electrical or optical signals, analog or digital signals, data, one or more computer or processor instructions, messages, a bit or bit stream, or other means that can be received, transmitted or detected.

Exemplary HSDs may thus provide a number of advantages over conventional hydraulic excavators and conventional electric hybrid excavators (EHEs). First, HSDs may use existing fixed displacement swing motor with added hydraulic motor/pump, together with an energy storage device, to recover kinetic energy from the braking operation of machine upper structure and reduce the metering losses resulting in better fuel economy than conventional vehicles. Second, HSDs may increase the effective productivity of the vehicle by using stored energy to perform swing operations and thus allowing more of the engine power to be used for other functions. Third, HSDs provide a reliable and seamless transition of machine upper structure acceleration and braking operation. Fourth, HSDs may assist engine power by using stored brake energy to provide more smooth and efficient operation of hydraulic actuation functions. Fifth, HSDs may lower cooling requirements compared to conventional machines due to reduced heat generation from fluid throttling across a swing valve and valves of other functions. Sixth, HSDs may allow for optimized engine operation through engine management: the presence of an accumulator as an auxiliary energy source can be utilized to manage the engine more efficiently for a given power demand, and by using advanced control which actively controls the engine speed and torque independently through intelligent control of the pump displacement, the engine may be controlled to its most efficient points, thereby significantly improving fuel economy. Seventh, HSDs may reduce the engine size required for a given application by using accumulator or swing power to supplement engine power with hydraulic power to thereby level the peak load experienced by the engine.

Besides the benefits mentioned above exemplary HSDs are lower cost than systems in which the fixed displacement motor attached to the swing drive machinery is replaced with a variable unit. Further, using a directional control valve to control the direction of flow and the pressure drop across the motor is also a lower cost solution than a series of independent meter valves. Additionally, there will be less flow losses because the flow in exemplary systems is directed through fewer valves. There is also the option of controlling the swing brake 19, to override the activation, preventing unnecessary wear using the swing brake override valve 21.

It is noted that exemplary valve architectures, systems, and control methods can also be applied to other systems such as load sense and positive flow control, for example.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic machine comprising:
an undercarriage;
a rotating structure rotatably mounted on the undercarriage and configured to rotate with and with respect to the undercarriage;
a first controller configured to receive user input;
a user interface configured to accept commands from a user and output a command signal to the controller;
a first gyroscope fixed to the rotating structure and electrically connected to the controller and configured to provide a data signal of rotation information of the rotating structure to the controller;
a variable displacement hydraulic swing pump operable by a prime mover;
a hydraulic swing motor for performing a swing function of the machine;
an accumulator;
a swing control valve assembly disposed in a first hydraulic path extending from the swing pump to the swing motor, the swing control valve assembly having a first position fluidly connecting the swing pump to a first side of the swing motor and a second position fluidly connecting the swing pump to a second side of the swing motor; and
an accumulator control valve having an open position fluidly connecting the accumulator to the first hydraulic path at an accumulator control valve connection point and a closed position fluidly isolating the accumulator from the first hydraulic path; and
an isolation valve disposed in the fluid pathway between the accumulator control valve connection point and the swing control valve, the isolation valve having an open position fluidly connecting the swing pump to the swing motor, and a closed position fluidly isolating the accumulator and the swing pump from the swing motor, wherein an axis of rotation of the gyroscope is parallel to the axis of rotation of the rotating structure, and wherein the controller is configured to generate a control signal to control the rotating structure and cause the rotating structure to rotate with respect to the undercarriage based on the command signal from the user interface and the data signal from the first gyroscope.

2. The hydraulic machine of claim 1, further comprising:
a second gyroscope fixed to the rotating structure and electrically connected to the controller and configured to provide a data signal of rotation information of the rotating structure to the controller, wherein an axis of rotation of the first gyroscope is parallel to an axis of rotation of the second gyroscope, but oriented in an opposite direction.

3. The hydraulic machine of claim 1, further comprising:
a gyroscope fixed to the undercarriage and configured to provide a data signal of rotation information of the undercarriage to the controller, wherein an axis of rotation of the gyroscope fixed to the undercarriage is parallel to the axis of rotation of the rotating structure, and wherein the controller is configured to ascertain the rotation of the rotating structure with respect to the undercarriage based on the data signal of the first gyroscope fixed to the rotating structure and the data signal of the gyroscope fixed to the undercarriage.

4. The hydraulic machine of claim 1, further comprising:
a second controller configured to generate a control signal to control the rotating structure and cause the rotating structure to rotate with respect to the undercarriage; and a relay having first and second control signal inputs, a decision input, and a control signal output, wherein the first control signal input is connected to the second controller and configured to receive the control signal generated by the second controller, the second control signal input is connected to the first controller and configured to receive the control signal generated by the first controller, and wherein the decision input is connected to the first controller and configured to receive a decision signal from the first controller, and wherein the relay is configured to output at the control signal output either one of the control signals received at the first and second control signal inputs based on the decision signal.

5. The hydraulic machine of claim 4, wherein the relay is configured to output at the control signal output the control signal received at the first control signal input if no decision signal is received.

6. The hydraulic machine of claim 1, further comprising:
a servo pressure shuttle configured to select a higher pressure source from between pump outlet pressure and a second pressure source, thereby to allow a sufficient pressure to be available to control swash angle of the pump.

7. The hydraulic machine of claim 6, wherein the second pressure source is provided by a pilot pump.

8. The hydraulic machine of claim 1, wherein flow from the swing motor to the swing pump is not metered.

9. The hydraulic machine of claim 1, wherein flow from the swing motor to the accumulator is not metered.

10. The hydraulic machine of claim 1, wherein the controller is configured to open the accumulator control valve and to disengage the swing pump.

11. The hydraulic machine of claim 1, wherein the controller is configured to close the accumulator control valve, meter flow through a dump valve, and engage the swing pump for use as a motor.

12. The hydraulic machine of claim 1, wherein the controller is configured to close the accumulator control valve and engage the swing pump for use as a motor, and wherein a system relief valve is configured to allow excess flow to go to a reservoir.

13. The hydraulic machine of claim 1, wherein the controller is configured to open the accumulator control valve, and engage the swing pump for use as a motor.

14. The hydraulic machine of claim 13, wherein the controller is configured to close a dump valve.

15. The hydraulic machine of claim 1, wherein the controller is configured to open the accumulator control valve, close the isolation valve, meter flow through a dump valve, and engage the swing pump for use as a pump.

16. The hydraulic machine of claim 1, wherein the controller is configured to open the accumulator control valve, close the isolation valve, and engage the swing pump for use as a pump, and wherein a system relief valve is configured to allow excess flow to go to a reservoir.

17. The hydraulic machine of claim 1, wherein the controller is configured to open the accumulator control valve, close the isolation valve, meter flow through a dump valve, and engage the swing pump for use as a motor.

18. The hydraulic machine of claim 1, wherein the controller is configured to open the accumulator control valve, close the isolation valve, and engage the swing pump for use as a motor, and wherein a system relief valve is configured to allow excess flow to go to a reservoir.

19. The hydraulic machine of claim 1, wherein the controller is configured to open the accumulator control valve, close the isolation valve, and engage the swing pump for use as a motor.

20. The hydraulic machine of claim 1, wherein the controller is configured to open the accumulator control valve, close the isolation valve, and engage the swing pump for use as a pump.

21. The hydraulic machine of claim 1, wherein the prime mover is an internal combustion engine and the controller is configured to monitor engine speed and torque, compare engine speed and torque with efficiency data, and adjust engine speed and adjust displacement of the hydraulic pump, and thereby engine torque, based on the comparison.

22. The hydraulic machine of claim 21, wherein the controller is configured to turn off the engine during operation of the hydraulic machine.

23. The hydraulic machine of claim 1, further comprising a low pressure accumulator disposed between a reservoir and the swing motor and configured to prevent cavitation in the system.

24. A hydraulic machine comprising:
an undercarriage;
a rotating structure rotatably mounted on the undercarriage and configured to rotate with and with respect to the undercarriage;
a first controller configured to receive user input and configured;
a user interface configured to accept commands from a user and output a command signal to the controller;
a first gyroscope fixed to the rotating structure and electrically connected to the controller and configured to provide a data signal of rotation information of the rotating structure to the controller; and a gyroscope fixed to the undercarriage and configured to provide a data signal of rotation information of the undercarriage to the controller, wherein an axis of rotation of the first gyroscope is parallel to the axis of rotation of the rotating structure, wherein the controller is configured to generate a control signal to control the rotating structure and cause the rotating structure to rotate with respect to the undercarriage based on the command signal from the user interface and the data signal from the first gyroscope, wherein an axis of rotation of the gyroscope fixed to the undercarriage is parallel to the axis of rotation of the rotating structure, and wherein the controller is configured to ascertain the rotation of the rotating structure with respect to the undercarriage based on the data signal of the first gyroscope fixed to the rotating structure and the data signal of the gyroscope fixed to the undercarriage.

25. A hydraulic machine comprising:

an undercarriage;

a rotating structure rotatably mounted on the undercarriage and configured to rotate with and with respect to the undercarriage;

a first controller configured to receive user input and configured;

a user interface configured to accept commands from a user and output a command signal to the controller;

a first gyroscope fixed to the rotating structure and electrically connected to the controller and configured to provide a data signal of rotation information of the rotating structure to the controller;

a second controller configured to generate a control signal to control the rotating structure and cause the rotating structure to rotate with respect to the undercarriage; and a relay having first and second control signal inputs, a decision input, and a control signal output, wherein the first control signal input is connected to the second controller and configured to receive the control signal generated by the second controller, the second control signal input is connected to the first controller and configured to receive the control signal generated by the first controller, and wherein the decision input is connected to the first controller and configured to receive a decision signal from the first controller, and wherein the relay is configured to output at the control signal output either one of the control signals received at the first and second control signal inputs based on the decision signal, wherein an axis of rotation of the gyroscope is parallel to the axis of rotation of the rotating structure, and wherein the controller is configured to generate a control signal to control the rotating structure and cause the rotating structure to rotate with respect to the undercarriage based on the command signal from the user interface and the data signal from the first gyroscope.

26. The hydraulic machine of claim 25, wherein the relay is configured to output at the control signal output the control signal received at the first control signal input if no decision signal is received.

27. A hydraulic machine comprising:

an undercarriage;

a rotating structure rotatably mounted on the undercarriage and configured to rotate with and with respect to the undercarriage;

a first controller configured to receive user input and configured;

a user interface configured to accept commands from a user and output a command signal to the controller;

a first gyroscope fixed to the rotating structure and electrically connected to the controller and configured to provide a data signal of rotation information of the rotating structure to the controller; and a second gyroscope fixed to the rotating structure and electrically connected to the controller and configured to provide a data signal of rotation information of the rotating structure to the controller, wherein an axis of rotation of the first gyroscope is parallel to the axis of rotation of the rotating structure, wherein the controller is configured to generate a control signal to control the rotating structure and cause the rotating structure to rotate with respect to the undercarriage based on the command signal from the user interface and the data signal from the first gyroscope, and wherein an axis of rotation of the first gyroscope is parallel to an axis of rotation of the second gyroscope, but oriented in an opposite direction.

* * * * *